United States Patent
Mamtsaderis et al.

(10) Patent No.: US 11,825,979 B2
(45) Date of Patent: Nov. 28, 2023

(54) SINGLE SERVE SYSTEMS, APPARATUSES, AND METHODS

(71) Applicant: Savepods Inc., East Northport, NY (US)

(72) Inventors: John Mamtsaderis, East Northport, NY (US); Julian Ian Hart, Santa Barbara, CA (US)

(73) Assignee: SAVEPODS INC., East Northport, NY (US)

( * ) Notice: Subject to any disclaimer, the term of this patent is extended or adjusted under 35 U.S.C. 154(b) by 0 days.

(21) Appl. No.: 18/094,538

(22) Filed: Jan. 9, 2023

(65) Prior Publication Data

US 2023/0146668 A1   May 11, 2023

Related U.S. Application Data

(63) Continuation-in-part of application No. 17/406,658, filed on Aug. 19, 2021.

(60) Provisional application No. 63/067,941, filed on Aug. 20, 2020, provisional application No. 63/119,002, filed on Nov. 30, 2020, provisional application No. 63/154,698, filed on Feb. 27, 2021.

(51) Int. Cl.
  *A47J 31/06*   (2006.01)
  *A47J 31/08*   (2006.01)
  *A47J 31/42*   (2006.01)
  *B01D 29/23*   (2006.01)
  *A47J 31/36*   (2006.01)

(52) U.S. Cl.
  CPC ......... *A47J 31/0689* (2013.01); *A47J 31/085* (2013.01); *A47J 31/3614* (2013.01); *A47J 31/42* (2013.01); *B01D 29/23* (2013.01); *A47J 31/3666* (2013.01); *B01D 2201/0423* (2013.01)

(58) Field of Classification Search
  CPC .... A47J 31/02; A47J 31/0626; A47J 31/0636; A47J 31/0689; A47J 31/08; A47J 31/085; A47J 31/3609; A47J 31/3614; A47J 31/3666; A47J 31/3671; A47J 31/3676; A47J 31/38
  USPC .......................................................... 99/323
  See application file for complete search history.

(56) References Cited

U.S. PATENT DOCUMENTS

| | | |
|---|---|---|
| 4,627,334 A | 12/1986 | Shanklin |
| 5,880,441 A | 3/1999 | Hartman et al. |
| 5,942,143 A | 8/1999 | Hartman et al. |

(Continued)

FOREIGN PATENT DOCUMENTS

JP    4589339 B2    12/2010

OTHER PUBLICATIONS

Keurig My K-Cup Universal Reusable Filter MultiStream Technology—Gray, accessed May 23, 2023 at: https://www.amazon.com/dp/B08DHC73P6?ref_=cm_sw_r_cp_ud_dp_E9CJRKY6ZZ1TFC3NQSC3&th=1.
Reusable K Cups For Keurig, Reusable K Cup Coffee Filter Refillable Single K Cup for Keurig 2.0 1.0 BPA Free-6 Packs, accessed at https://www.amazon.com/dp/B07MNHDR7L?ref_=cm_sw_r_cp_ud_dp_HGAZMWTMPSP0G3Z8DG5C&th=1.

(Continued)

*Primary Examiner* — Reginald Alexander
(74) *Attorney, Agent, or Firm* — Carter, DeLuca & Farrell LLP

(57) ABSTRACT

A single serve pod system, a single serve pod assembly system, a single serve pod, a reusable pod apparatus, a process of assembling the single serve pod, and methods of use are presented. More specifically, and without limitation, the present disclosure relates to preparation of a single serve pod in accordance with brewing coffee, tea, and/or other brewing.

11 Claims, 25 Drawing Sheets

(56) References Cited

U.S. PATENT DOCUMENTS

| | | | |
|---|---|---|---|
| 5,952,028 A | 9/1999 | Lesser | |
| 6,007,853 A | 12/1999 | Lesser | |
| 6,189,438 B1* | 2/2001 | Bielfeldt | A47J 31/08 |
| | | | 99/321 |
| 7,591,218 B2 | 9/2009 | Bunn et al. | |
| 8,720,320 B1 | 5/2014 | Rivera | |
| 8,794,125 B1 | 8/2014 | Rivera | |
| 8,863,650 B2 | 10/2014 | Lin | |
| 8,967,038 B2 | 3/2015 | Rivera | |
| 9,232,871 B2 | 1/2016 | Rivera | |
| 9,290,343 B1* | 3/2016 | Roberts | B65H 3/56 |
| D771,434 S | 11/2016 | Burrows | |
| 9,717,365 B2 | 8/2017 | Geissler et al. | |
| 9,723,942 B2 | 8/2017 | Do | |
| 10,034,569 B2 | 7/2018 | Khalifa | |
| 11,045,036 B2 | 6/2021 | Khalifa | |
| 2005/0109689 A1 | 5/2005 | Trachtenbroit | |
| 2006/0169149 A1 | 8/2006 | Voss et al. | |
| 2010/0037780 A1 | 2/2010 | Pas et al. | |
| 2010/0112164 A1* | 5/2010 | Taylor | A47J 31/02 |
| | | | 206/217 |
| 2012/0321748 A1* | 12/2012 | Otto | A47J 31/085 |
| | | | 99/302 R |
| 2013/0256307 A1 | 10/2013 | Hewitt | |
| 2014/0013959 A1* | 1/2014 | Fujii | A47J 31/0636 |
| | | | 99/323 |
| 2022/0053964 A1 | 2/2022 | Mamtsaderis | |

OTHER PUBLICATIONS

Reusable K Cups For Keurig | Keurig Reusable Coffee Pods,Universal stainless steel k Cups for Keurig 2.0 and 1.0 Coffee Makers-brewers(2pack), accessed May 23, 2023 at: https://www.amazon.com/dp/B09F8J3932?_encoding=UTF8&ref_=cm_sw_r_cp_ud_dp_DG60A1RHK8FHBC53J8JG&th=1.

K Cup Reusable Coffee Pods—New Stainless Steel 2022 Model—Refillable Coffee Filter Pod for Keurig 2.0 and Backward Compatible With Original Keurig—By Fill N Save, accessed May 23, 2023 at: https://www.amazon.com/dp/B0B23KVH45?_encoding=UTF8&psc=1&ref_=cm_sw_r_cp_ud_dp_8TG2XYMPHABAAVP47WMY.

EZ-Cup Stainless Steel Reusable K Cup Coffee Pod + 25 Disposable Paper Filters—Refillable Capsule Compatible with Keurig 1.0 2.0 K-Slim K-Mini Plus K-Duo K-Series & Other Select Models, accessed May 23, 2023 at: https://www.amazon.com/dp/B084L49119?ref_=cm_sw_r_cp_ud_dp_PREYG43H08VQYDP5K0R9.

SCS Direct Reusable Coffee K-cup Cups (Set of 2) with 50 Filters—100% Compatible with Keurig, accessed May 23, 2023 at: https://www.walmart.com/ip/Reusable-Coffee-K-cup-Cups-Set-of-2-with-50-Filters-100-Compatible-with-Keurig/38453210.

San Francisco Bay Compostable Coffee Pods—French Roast (80 Ct) K Cup Compatible including Keurig 2.0, Dark Roast, accessed May 23, 2023 at: https://www.amazon.com/dp/B007TGDXNO?_encoding=UTF8&ref_=cm_sw_r_cp_ud_dp_Z6XMWJV6KR8MKSNFAP8P&th=1.

* cited by examiner

SINGLE SERVE SYSTEMS, APPARATUSES, AND METHODS

CROSS-REFERENCE TO RELATED APPLICATIONS

The present application is a continuation-in-part of U.S. patent application Ser. No. 17/406,658, filed Aug. 19, 2021, which claims the benefit of and priority to U.S. Provisional Patent Application No. 63/067,941, filed Aug. 20, 2020, U.S. Provisional Patent Application No. 63/119,002, filed Nov. 30, 2020, and U.S. Provisional Patent Application No. 63/154,698, filed Feb. 27, 2021. The entire contents of each of the foregoing applications are hereby incorporated by reference herein.

TECHNICAL FIELD

This disclosure relates to a pod for a single serve brewing system and also relates to associated apparatuses for assembling and loading the pod.

BACKGROUND

Home brewing and preparation of coffee, tea and other brewing is well known in the art. As one example, and only for ease of explanation, brewing coffee at home has grown common in society. Coffee preparation is the process of turning coffee beans into a beverage. Coffee, as one example, is generally made by pouring hot water onto coffee grounds. The water is then typically filtered through to remove the coffee grounds, and provide a user with coffee to drink.

Various methods of home brewing are well known in the art including using a drip brew coffee and/or a drip brewed coffee machine, a filtered coffee, a pour-over, an immersion brewer, a percolator, a French press, or a single serve coffee apparatus that filters coffee through a single cup, providing a single serving size.

The transition from pot brewing, or brewing an entire carafe of coffee, to single cup brewing has grown very popular and commonplace in recent years. Single serve brewing systems let a predetermined amount of water (generally heated) go through a coffee portion or single serve cup (filled with coffee grinds). A single serve cup is also known as a coffee pod.

In this way, and as is known in the state of the art, a user can brew a single, standardized cup of coffee. This is beneficial for speed, ease, and decreasing waste of time and resources in brewing an entire pot of coffee or similar. Furthermore, single serve coffee pods also allow a user to control portions, strength, temperature at brewing, temperature at consumption, and a number of other factors. This convenience, depending on the single serve method, is often provided at the touch of a button.

A common single serve brewing method is through the use of disposable coffee pods. Disposable coffee pods are generally pre-packed and shipped with a measured amount of grounds within each sealed, single serve container. These single serve coffee pods are then inserted into machines to be punctured, brewed, and then disposed of Single serve coffee pods are generally made of plastic and sometimes metal. This type of single serve coffee pod, most commonly used, generates large amounts of waste. Furthermore, these coffee pods usually cannot be recycled because they contain food waste from coffee, tea leaves, or the like. Some single serve pods can be recycled if food waste is first removed and the plastic cups are cleaned out. Then, in this case, and in some circumstances, the remaining plastic may possibly be recycled. This build of plastic waste pollutes landfills with billions of plastic coffee pods every year. Furthermore, these plastic single serve pods tend to be expensive, relative to the price of coffee. A user may often find they can purchase hand-crafted coffee at a more affordable price. Complicating matters further, single serve plastic or metal coffee pods provide a very harsh taste. As heat and fluid extract ingredients, they also extract plastic and/or metal or other materials (which the single serve pod) is constructed from. This often results in a poor quality taste and potentially unhealthy consequences of single serve pod brewing.

An alternative solution, existing in the art as of recently, provides a commercially compostable single serve pod. Some of the commercially compostable options, which have emerged recently, may potentially break down in a landfill. Many of these options are unproven but could potentially prove fruitful in reducing landfill waste. However, these options are not reusable and tend to be very expensive. This option still results in environmental harm due to production and shipping of the commercially compostable single serve pods, which can be intensive to produce and ship. Furthermore, the expense of commercially compostable single serve pods has shown evidence of forcing people back to the plastic option. Furthermore, the commercially compostable material, and the nature of the material that must be used tends to remove all flavor from the ingredients within, drastically reducing the flavor of the final brewed cup, especially over increased durations of time. One of the primary reasons for loss in coffee flavor, in a single-serve plastic cup, may be due to oxidation and/or the exposure of coffee grounds to the air. In fact, some coffees should be brewed within 24 hours of grinding. Thus, there is still a need in the art for a more sustainable and environmentally friendly solution that still provides a flavorful cup of single brewed beverage, or the like.

Another alternative which has emerged in the art is a reusable single serve coffee pod. This device is a single serve pod with a metal mesh that can filter the ingredients of coffee grounds and the like. Generally, this device has a lid and a basket-like piece that must be cleaned before each use (and must be cleaned manually). Unfortunately, the design and shape of these pods do not allow for efficient emptying of used ingredients because these designs have a closed basket-like piece that does not allow for ease in cleaning. Oftentimes, materials or contents are left behind which can mold or cause bacterial growth, and this can cause subsequent cups to be brewed based on aged ingredients and can affect taste. Due to the time, effort, and other shortcomings involved with current reusable pods, these solutions have also proven to be difficult as a replacement for plastic single serve pods. Furthermore, the reusable pods, as a failure of design tend to be disposed of often, causing plastic and metal to continue to contaminate landfills. Thus, this alternative solution fails to eliminate landfill waste, ease of use, or taste defects which are plaguing the art.

Thus, there is a long-felt need in the art for an environmentally friendly, more easy-to-use single serve brewing solution that maintains flavor while providing longevity, among solving other long-felt needs plaguing the art.

The disclosure herein provides these advantages and others as will become clear from the specification and claims provided.

SUMMARY

A single serve pod system, a single serve pod assembly apparatus, a reusable pod apparatus, a single serve pod, a process of assembling the single serve pod, and methods of use are presented herein. More specifically, and without limitation, the present disclosure provides a single serve pod system for the preparation of a single serve pod in accordance with brewing coffee, tea, and/or other brewing that is environmentally friendly, reduces landfill waste, and maintains the integrity of flavor The present disclosure provides a single serve pod system which improves upon the state of the art and provides a convenience for users, while also providing an environmentally friendly solution to many problems plaguing the art today. The present disclosure provides a solution to cleaning issues, cleanliness issues, waste issues, assembly issues, portioning issues, freshness issues, and more.

In the present disclosure, as further described herein, the present disclosure provides a single serve pod system that may provide a user with a fresh and easy to use filter for each single serve cup, while also reducing waste and/or providing environmental consciousness. Furthermore, the present disclosure provides solutions that are relatively cost effective, quick, and efficient.

In various embodiments, as one example, the present disclosure provides a single serve coffee pod which combines reusability, disposability, and biodegradability with convenience. Furthermore, the present disclosure combines the unique single serve coffee pod with a novel assembly apparatus that provides for portionality, cleanliness, and convenience, among other features and components and advantages.

Aspects of the disclosure provide a reusable pod apparatus and a single serve pod that are compatible with existing single serve brewing equipment.

In accordance with aspects of the present disclosure, a system includes a filter configured for a single serve brewing system where the filter includes a lip and a cavity configured to hold a brew ingredient, a reusable ring configured to hold the filter to be used in the single serve brewing system and, after being used in the single serve brewing system, to release the filter, where the reusable ring is bottomless and is removable from the single serve brewing system, and a reusable lid configured to cover a top of the reusable ring where the reusable lid includes at least one aperture. The reusable lid, the filter, and the reusable ring combine to form an assembled single serve pod in which the reusable lid covers the top of the reusable ring, the lip of the filter is held between the reusable lid and the reusable ring, and the cavity of the filter extends through the reusable ring. The assembled single serve pod is configured to be insertable into the single serve brewing system for brewing a brewed beverage and to be removable from the single serve brewing system.

In various embodiments of the system, the filter is configured to be used for a single brew in the single serve brewing system. In various embodiments of the system, the filter is formed of paper.

In various embodiments of the system, the reusable ring includes a ring body and a rim extending from a top of the ring body.

In various embodiments of the system, in the assembled single serve pod, the reusable lid rests on the rim of the reusable ring.

In various embodiments of the system, the system includes a heat-resistant ring configured to surround the ring body of the reusable ring.

In various embodiments of the system, the system includes a single serve pod assembly apparatus that includes an assembly station configured to receive the reusable ring and the filter.

In various embodiments of the system, the single serve pod assembly apparatus includes a filter dispenser configured to dispense a plurality of filters.

In various embodiments of the system, the single serve pod assembly apparatus includes a single housing that houses the assembly station and the filter dispenser.

In various embodiments of the system, the single serve pod assembly apparatus includes a storage container configured to hold a brew ingredient, and a hook configured to hang a scoop where the scoop is configured to scoop the brew ingredient from the storage container and to transfer the brew ingredient into the filter in the assembly station.

In various embodiments of the system, the single serve pod assembly apparatus includes a single housing that houses the assembly station, the filter dispenser, and the storage container.

In various embodiments of the system, the single serve pod assembly apparatus includes a grinder configured to produce the brew ingredient.

In accordance with aspects of the present disclosure, a single serve pod includes a filter configured for a single serve brewing system where the filter includes a lip and a cavity configured to hold a brew ingredient, a reusable ring configured to hold the filter to be used in the single serve brewing system and, after being used in the single serve brewing system, to release the filter, where the reusable ring is bottomless and is removable from the single serve brewing system, and a reusable lid configured to cover a top of the reusable ring where the reusable lid includes at least one aperture. The reusable lid, the filter, and the reusable ring combine to form an assembled single serve pod in which the reusable lid covers the top of the reusable ring, the lip of the filter is held between the reusable lid and the reusable ring, and the cavity of the filter extends through the reusable ring. The assembled single serve pod is configured to be insertable into the single serve brewing system for brewing a brewed beverage and to be removable from the single serve brewing system.

In various embodiments of the single serve pod, the filter is configured to be used for a single brew in the single serve brewing system. In various embodiments of the single serve pod, the filter is formed of paper.

In various embodiments of the single serve pod, the reusable ring includes a ring body and a rim extending from a top of the ring body.

In various embodiments of the single serve pod, in the assembled single serve pod, the reusable lid rests on the rim of the reusable ring.

In various embodiments of the single serve pod, the single serve pod includes a heat-resistant ring configured to surround the ring body of the reusable ring.

In accordance with aspects of the present disclosure, a system includes a filter configured for a single serve brewing system where the filter includes a lip and a cavity configured to hold a brew ingredient, and a reusable pod apparatus configured to hold the filter to be used in the single serve brewing system and, after being used in the single serve brewing system, to release the filter, where the reusable pod apparatus is bottomless and is removable from the single serve brewing system. The reusable pod apparatus and the filter combine to form an assembled single serve pod in which the reusable pod apparatus supports the lip of the filter and the cavity of the filter extends through the reusable pod apparatus. The assembled single serve pod is configured to be insertable into the single serve brewing system for brewing a brewed beverage and to be removable from the single serve brewing system.

In various embodiments of the system, the reusable pod apparatus includes a bottomless ring.

These and other objects, features, or advantages of the present disclosure will become apparent from the specification and claims.

DETAILED DESCRIPTION

Figure 1:
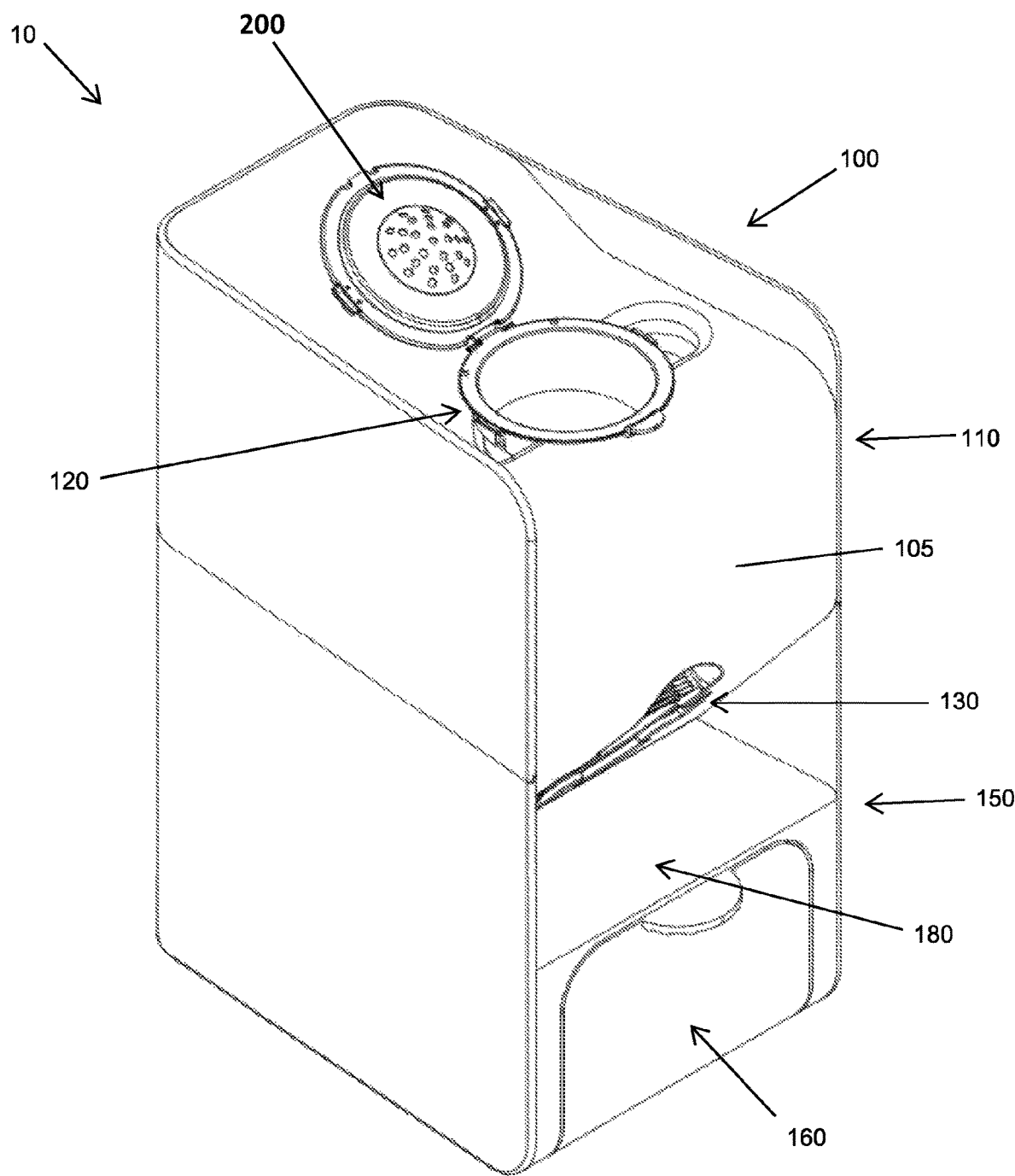
FIG. 1 is a diagram of an example of a single serve pod system, in accordance with aspects of the present disclosure.
Figure 2:
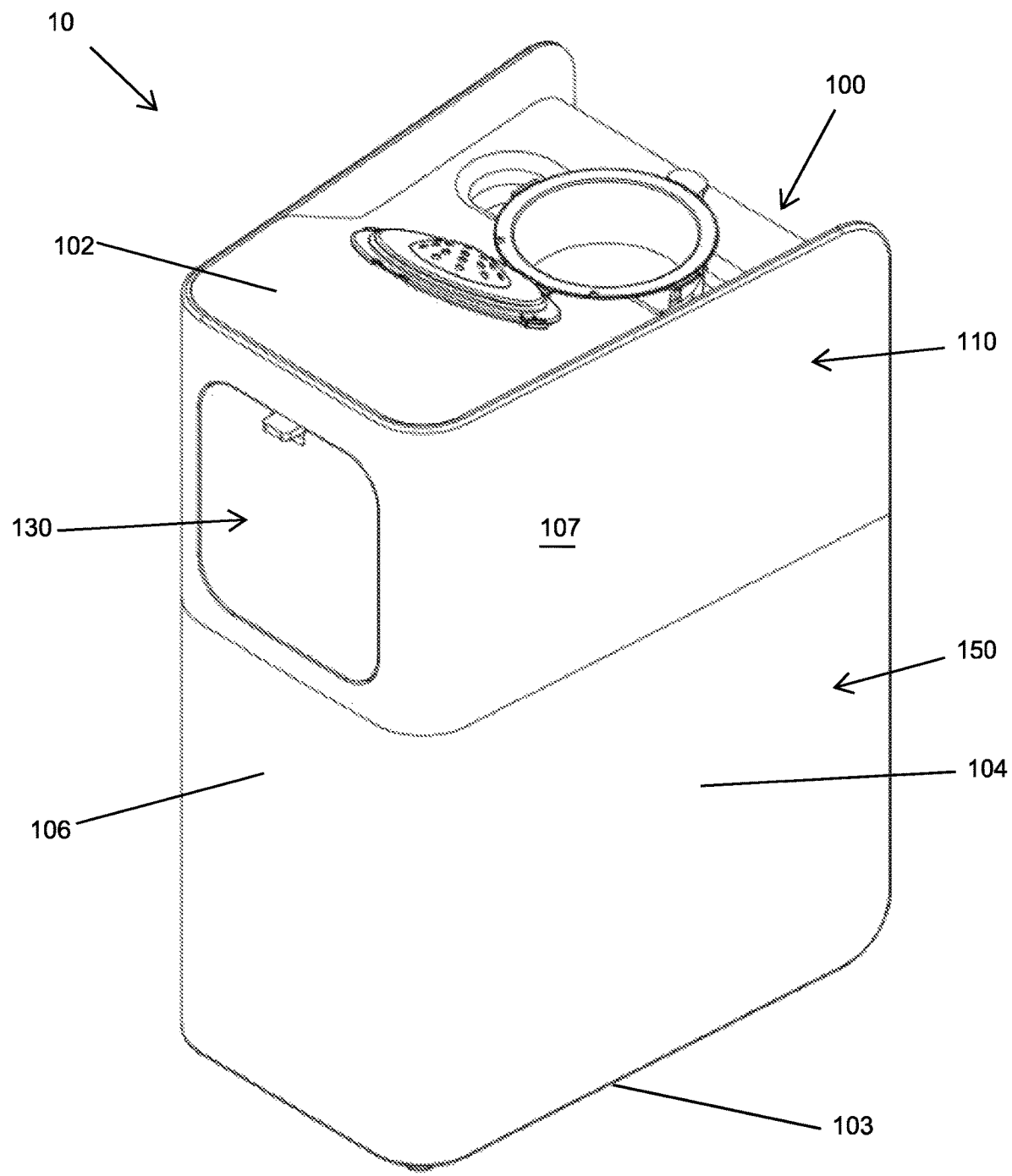
FIG. 2 is a perspective view showing aspects of the single serve pod system of FIG. 1, in accordance with aspects of the present disclosure.
Figure 3:
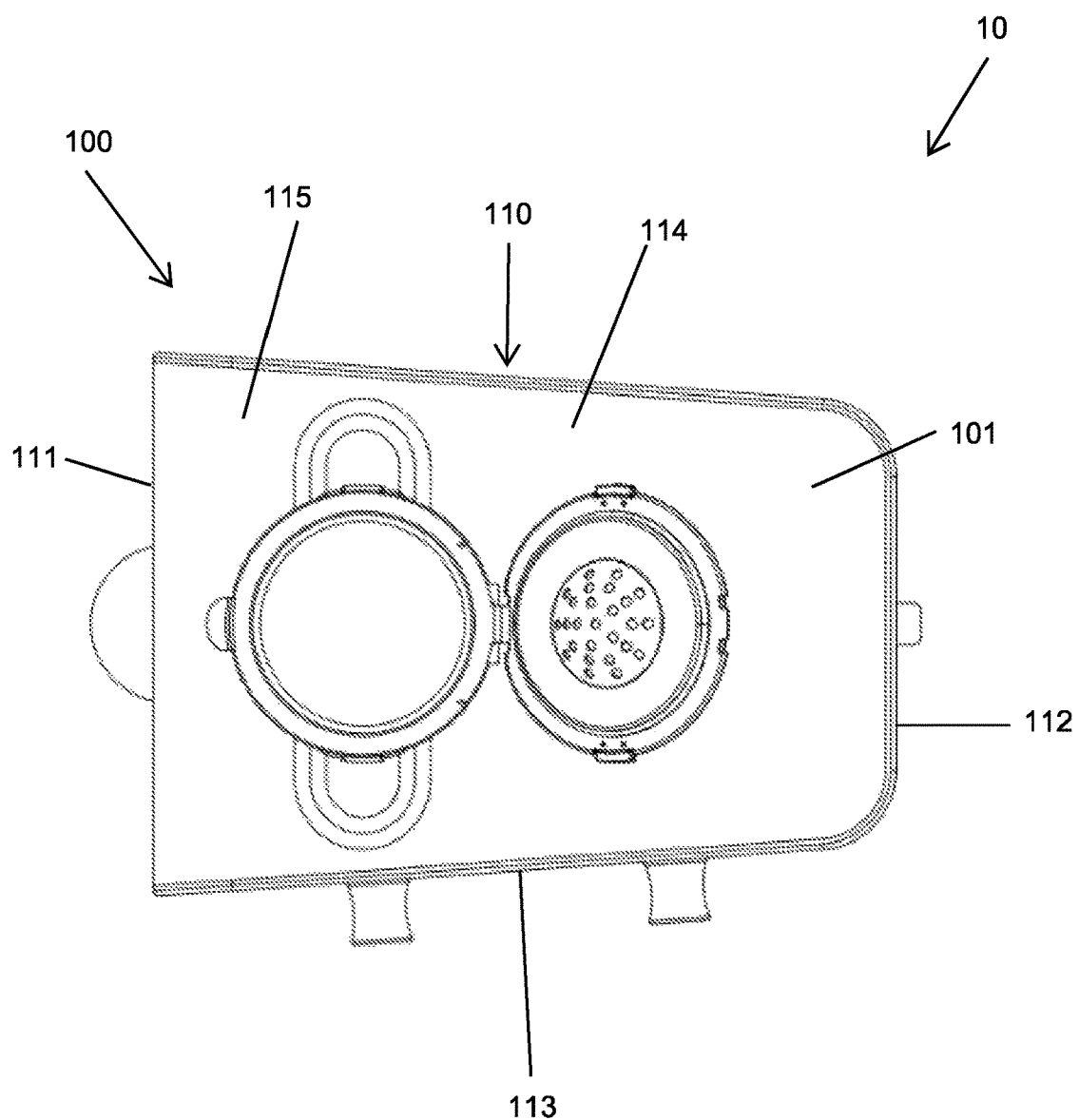
FIG. 3 is a top view showing aspects of the single serve pod system of FIG. 1, in accordance with aspects of the present disclosure.
Figure 4:
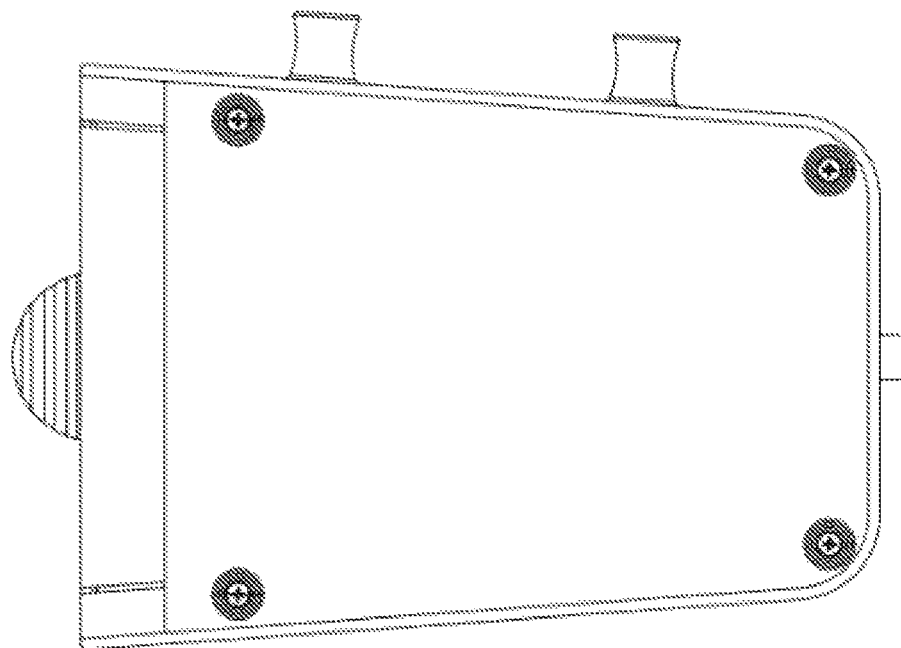
FIG. 4 is a bottom view showing aspects of the single serve pod system of FIG. 1, in accordance with aspects of the present disclosure.
Figure 5:
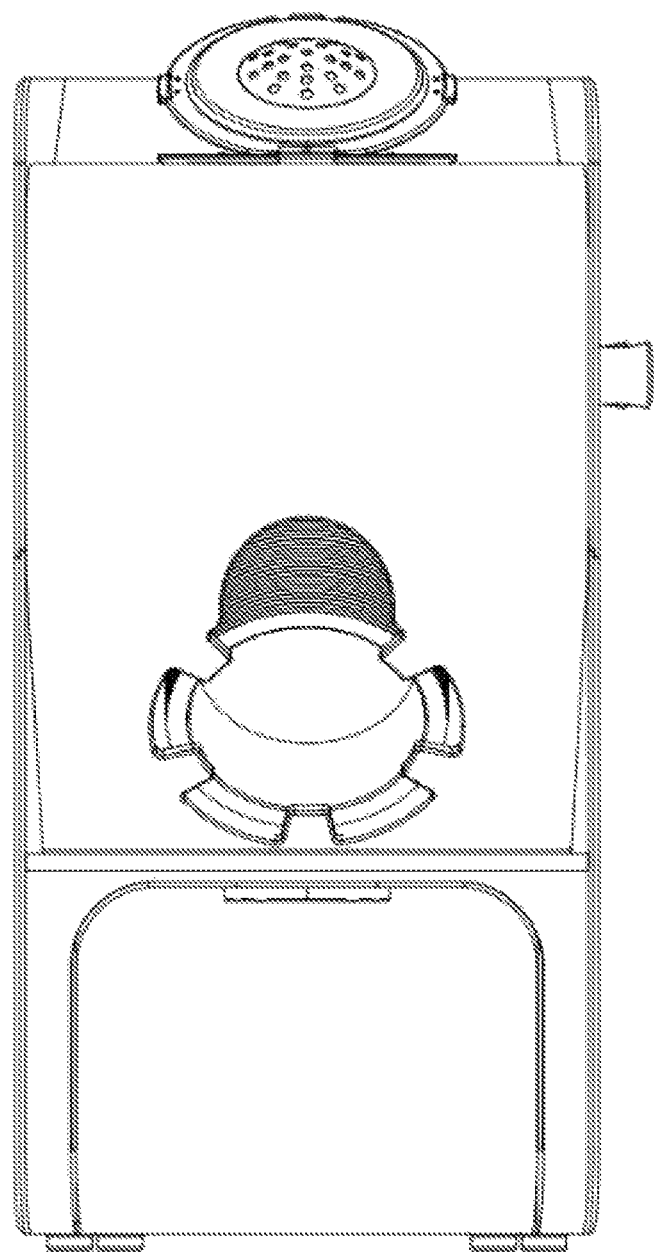
FIG. 5 is a front, elevation view showing aspects of the single serve pod system of FIG. 1, in accordance with aspects of the present disclosure.
Figure 6:
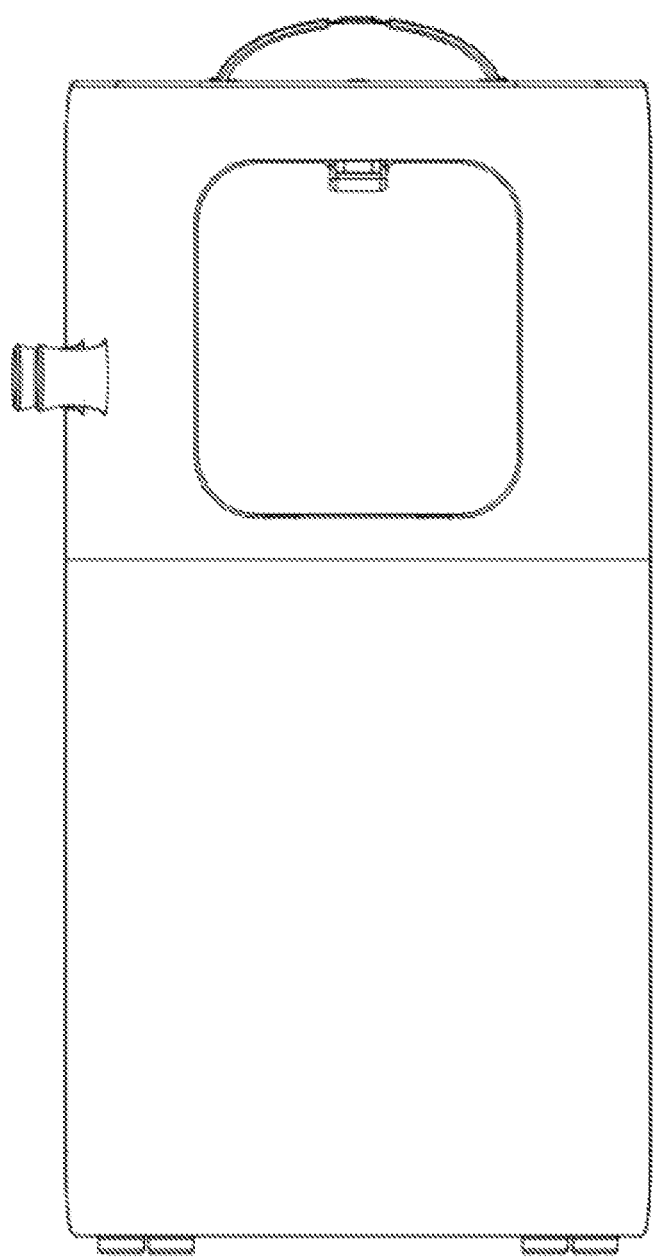
FIG. 6 is a rear, elevation view showing aspects of the single serve pod system of FIG. 1, in accordance with aspects of the present disclosure.
Figure 7:
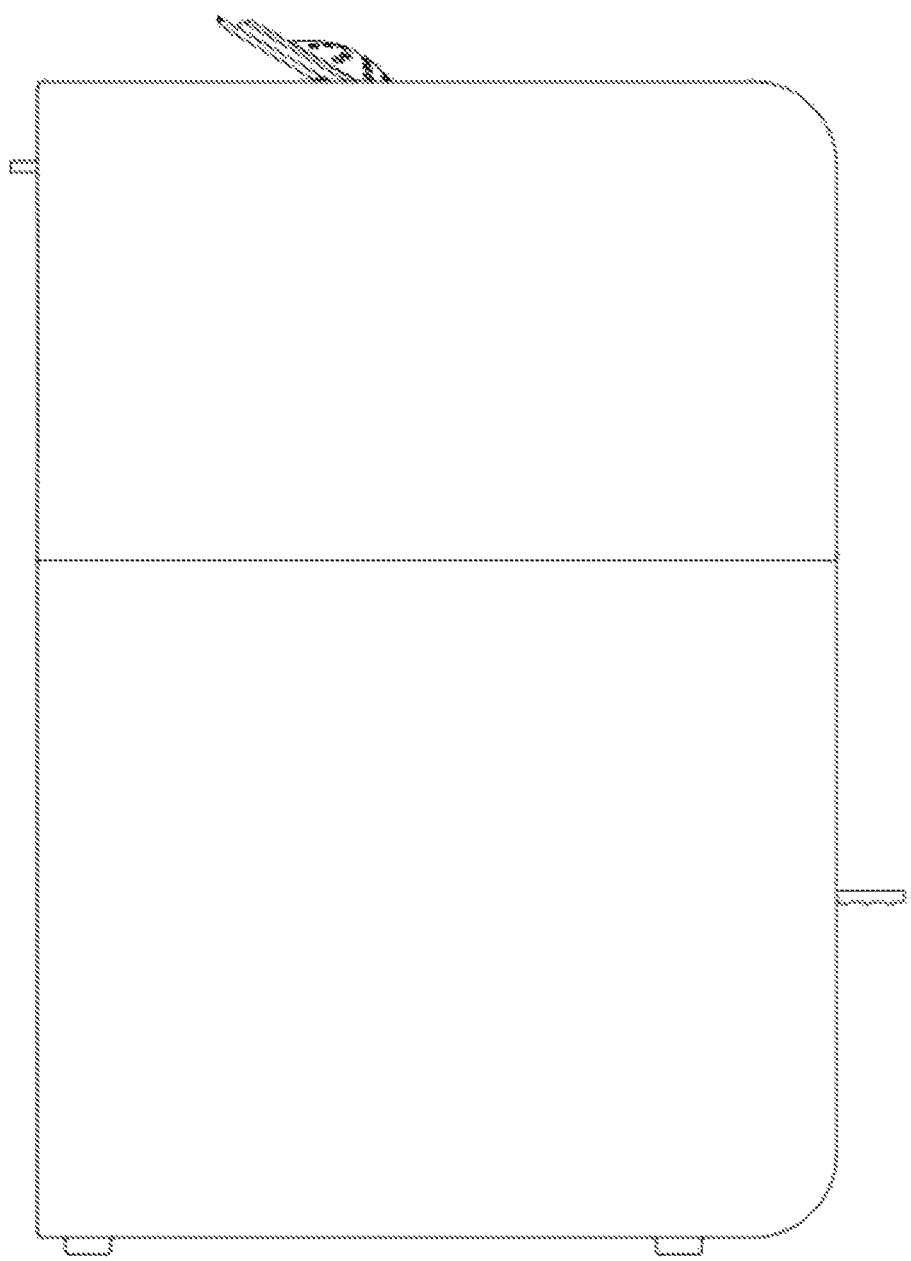
FIG. 7 is a side, elevation view showing aspects of the single serve pod system of FIG. 1, in accordance with aspects of the present disclosure.
Figure 8:
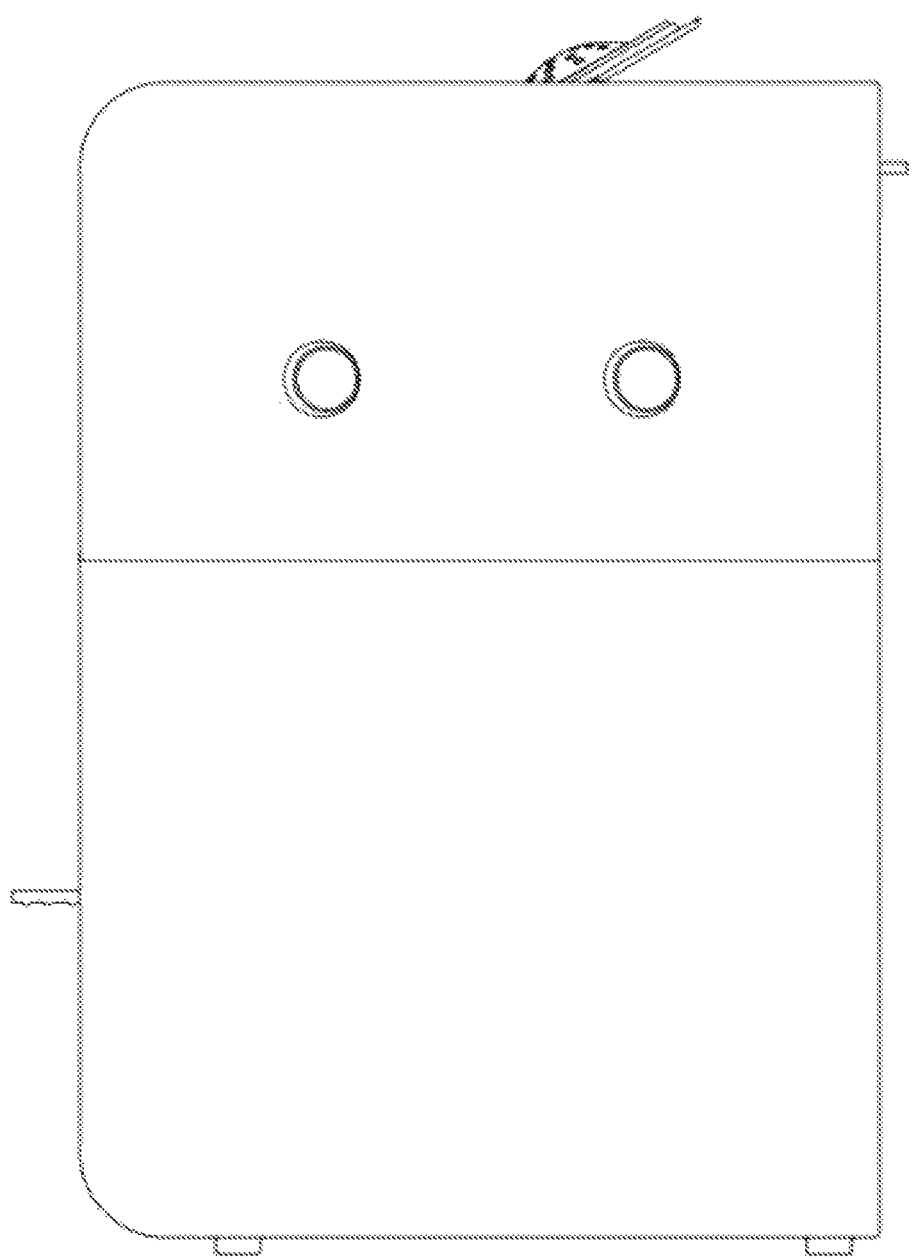
FIG. 8 is a side, elevation view showing aspects of the single serve pod system of FIG. 1, in accordance with aspects of the present disclosure.
Figure 9:
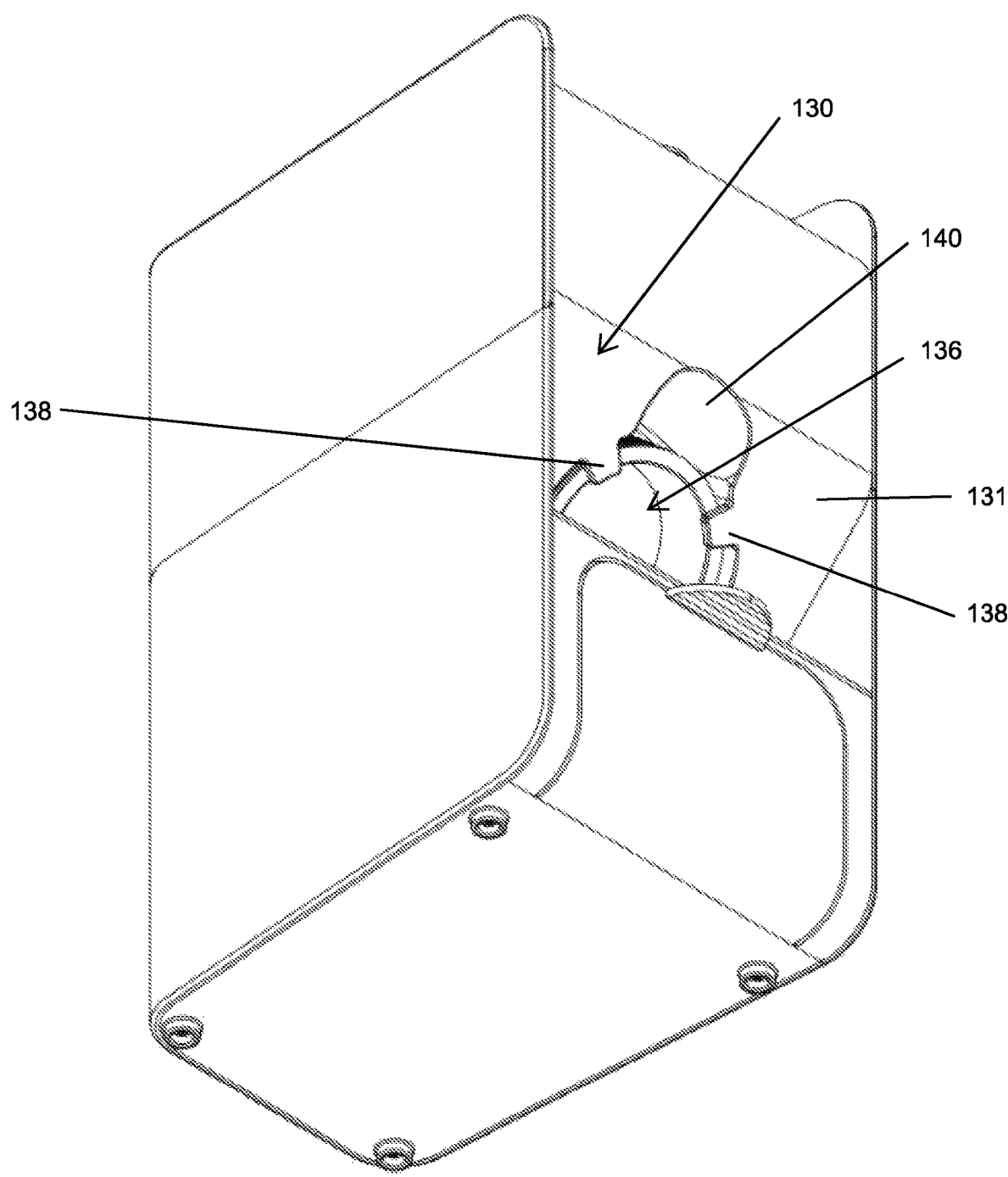
FIG. 9 is a bottom, perspective view showing aspects of the single serve pod system of FIG. 1, in accordance with aspects of the present disclosure.
Figure 10:
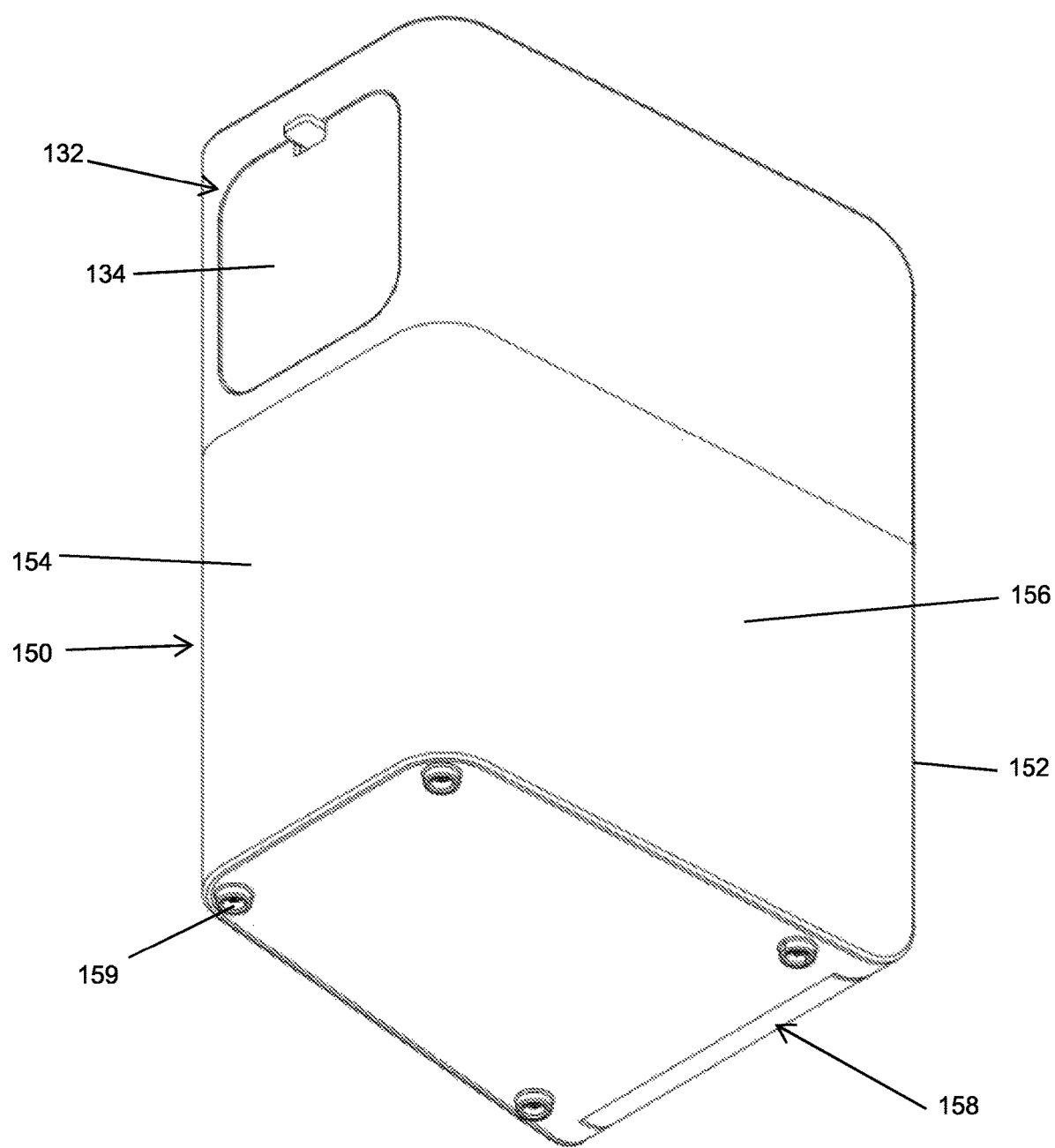
FIG. 10 is another bottom, perspective view showing aspects of the single serve pod system of FIG. 1, in accordance with aspects of the present disclosure.
Figure 11:
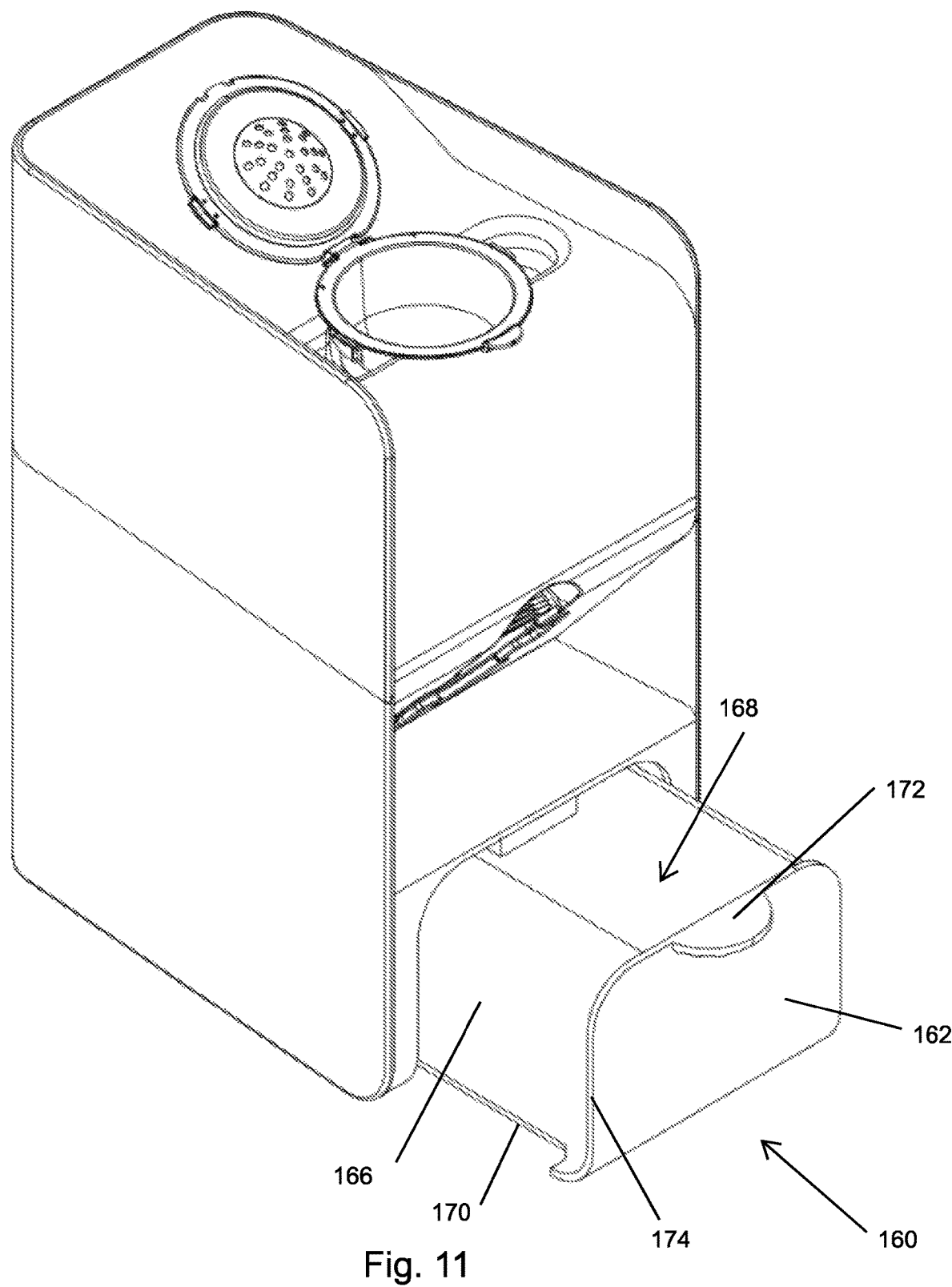
FIG. 11 is a diagram showing the single serve pod system of FIG. 1 with an open storage container, in accordance with aspects of the present disclosure.
Figure 12:
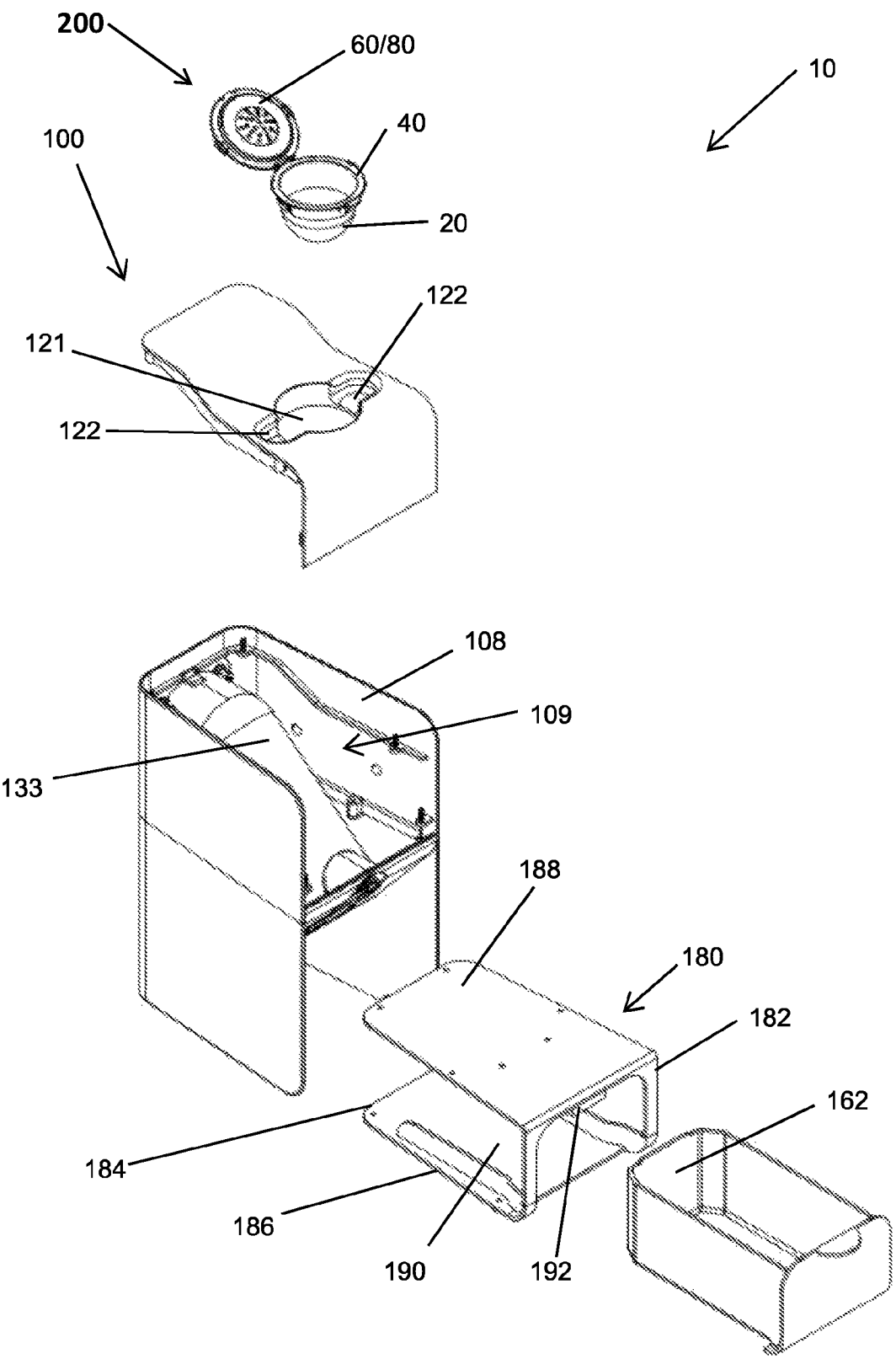
FIG. 12 is a diagram of components of the single serve pod system of FIG. 1 in a disassembled and/or exploded state, in accordance with aspects of the present disclosure.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

In accordance with aspects of the present disclosure, a single serve pod system (e.g., 10), a single serve pod assembly apparatus (e.g., 100), a reusable pod apparatus (e.g., 250), a single serve pod (e.g., 200), a process of assembling the single serve pod, and methods of use are presented. More specifically, in various embodiments, the present disclosure provides a single serve pod preparation system for the preparation of a single serve pod in accordance with brewing coffee, tea, and/or other brewing that is environmentally friendly, reduces landfill waste, and maintains the integrity of flavor. More specifically, in accordance with aspects of the present disclosure, the present disclosure provides a unique reusable pod apparatus (e.g., 250) that is bottomless, easy to use, and usable with disposable filters.

The present disclosure provides a single serve pod system which improves upon the state of the art and provides a convenience for users, while also providing an environmentally friendly solution to many problems plaguing the art today. The present disclosure provides a solution to cleaning issues, cleanliness issues, waste issues, assembly issues, portioning issues, freshness issues, and more.

In the present disclosure, as is further described herein, the present disclosure provides a single serve pod system that provides a user with a fresh and easy to use filter for each single serve cup, while also reducing waste and/or providing environmental consciousness. Furthermore, the present disclosure provides solutions that are relatively cost effective, quick, and efficient by using, e.g., a bottomless, open, reusable pod apparatus (e.g., 250) that allows for less cleaning, easier waste disposal, easier loading, easier storage, shorter profile, and ability to hang on a hook.

Single Serve Pod System:

With reference to FIG. 1, a single serve pod system 10 is presented (which may hereafter be referred to simply as "system"). The single serve pod system 100 includes a single serve pod assembly apparatus 100 and an assembled pod 200, among other components, which will be described below herein. The assembled pod 200 is a "single serve" pod in the sense that it is usable in a single serve brewing system (not shown) for a single brew that serves an individual. Accordingly, the assembled pod 200 may be referred to herein as a "single serve pod." As explained below herein, portions of or all of the assembled pod 200 may be reusable for multiple brews in a single serve brewing system. Single serve pod system 10 is formed of any suitable size, shape and design and is configured to provide an easy, efficient system for assembly and use of a single serve pod 200.

As explained in more detail below in connection with FIG. 16, the single serve pod 200 includes a filter 20, a ring 40, a lid feature 60, an alternative lid feature 80. Aspects of the single serve pod assembly apparatus 100, among other features, components, and functionality, are described below in connection with FIGS. 2-12.

In the arrangement shown, as one example, the single serve pod system 10 may also include or may operate or communicate with remote servers, databases, application servers, application databases, product databases, mobile applications, and/or computers; all of which in continuity or as separate acts fulfill the functions and methods disclosed herein.

User:

In the arrangement shown, as one example, system 10 is used by a user. User may be any user or person, or plurality of users interacting with or utilizing the system 10. This may include filling or refilling ingredients in the storage container, scooping ingredients, filling or refilling filters, utilizing the assembly apparatus (to be further discussed herein), hanging or removing the reusable rings, placing filters within the reusable rings, placing the single serve pod into the assembly apparatus, assembling single serve pods, reusing and/or cleaning the system among other features and functionality. Furthermore, this may include viewing, controlling, analyzing, manipulating, and/or interacting with the system 10. Furthermore, users are not limited to a single user but may be a plurality of users. Additional equipment might be utilized in operation, such as but not limited to, a single serve coffee brewing machine or the like.

Figure 13:
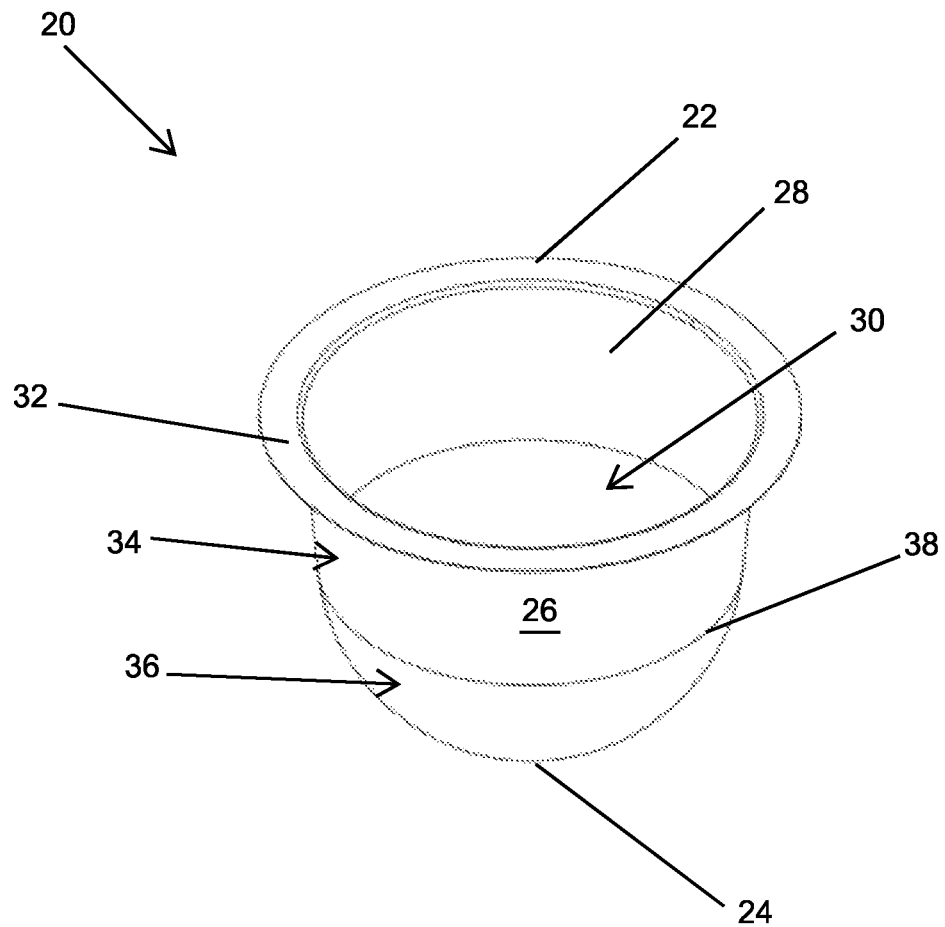
FIG. 13 is a diagram of an example of a filter, in accordance with aspects of the present disclosure.
Figure 14:
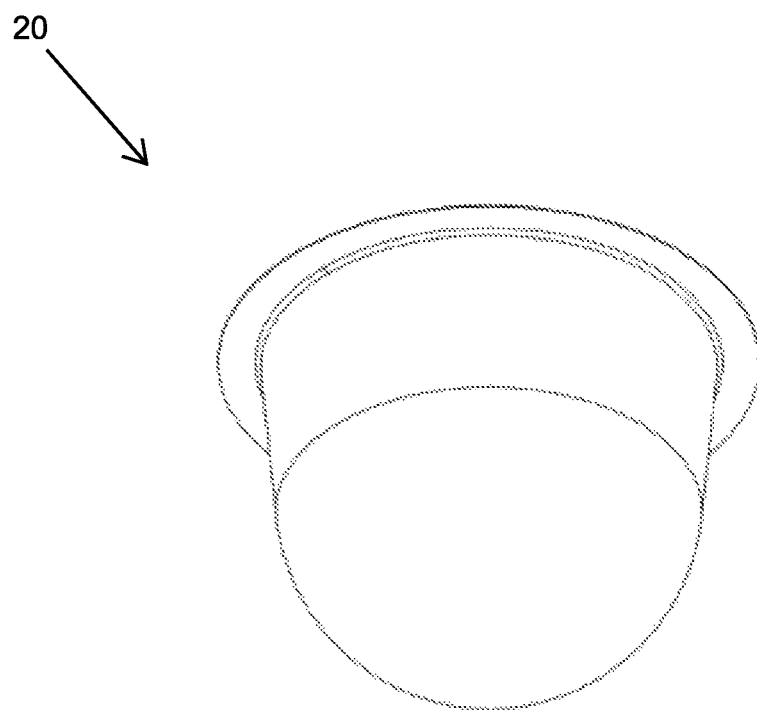
FIG. 14 is a bottom, perspective view of the filter of FIG. 13, in accordance with aspects of the present disclosure.

Filter:

In the arrangement shown, as one example and specifically with reference also to FIG. 13 and FIG. 14, the system 10 includes one or more filters 20 (which may be referred to herein as a "coffee filter", "ingredients filter", "disposable filter", or simply a "filter"). Filter 20 is formed of any suitable size, shape, and design and is configured to trap ingredients such as coffee grounds while allowing the liquid and/or water to flow through. In this way, filter 20 can remove unwanted compounds and/or unwanted particles during the brewing process.

In the arrangement shown, filter 20 extends from a top 22 to a bottom 24 having an exterior surface 26 and an interior surface 28 with a hollow interior/cavity 30 formed therein. The top 22 of the filter 20 includes a top lip 32, or lip 32. Lip 32 also extends the peripheral circumference, in the example shown. In this way, the lip 32 serves as a setting portion and/or gripping surface such that the reusable ring (to be further discussed herein) can secure the filter in place.

Furthermore, in the arrangement shown, as one example, filter 20 includes an upper portion 34 and a lower portion 36. The filter 20 shown, as one example, may also include measuring lines, among other features, components, and functionalities. Furthermore, the filter may also be double or triple walled as desired from time to time. In the arrangement shown, as one example, the lower portion 36 of filter 20 is generally semi-spherical in shape and designed to house ingredients or other grounds therein. Similarly, the upper portion 34 of the filter 20 is configured to house ingredients and/or accept water therein while being shaped to act as a funnel which keeps grounds and/or other ingredients in the hollow interior/cavity 30 of the filter 20.

In the arrangement shown, as one example, filter 20 is formed of a paper. In this way, water and/or liquid can move through the entirety of filter 20, including the sides and the bottom. Similarly, in this way, the entire interior surface of the filter 20 provides for filter and/or funneling and the removal of pulp or particular grounds or tea leaves and the like. Furthermore, in this way, the structural components of filter 20 can be crimped into place. Crimping is one form contemplated for use, however, other forms of strengthening and/or creating the filter 20 are also hereby contemplated for use.

In the arrangement shown, as one example, filter 20 is formed of paper, whether bleached or unbleached, or the like. However, filter 20 may also be formed of a metal mesh, an alternative mesh, such as a nylon mesh, a plastic mesh, a combination thereof, or the like as will be able to remove a desired level of particulate.

In the arrangement shown, as one example, a single serve pod 200 generally is designed to accommodate a single filter 20 for a single brew. However, other numbers of filters 20 are also hereby contemplated for use. In the case of a metal mesh, the filter 20 may be used over and over again, while the paper filter 20 embodiment would likely be discarded after use. Furthermore, multiple filters can be overlaid, and the like.

In the arrangement shown, as one example, filter 20 is formed in a dome-like shape. In this way, the unique design and shape are configured to maximize the amount of coffee in the space and/or volume. In this way, extraction is maximized through the bottom of the filter, which increases and improves upon the state of the art of single serve coffee brewing.

Reusable Pod Apparatus:

With reference also to FIGS. 14-18, in the arrangement shown, as one example, the system 10 includes a reusable pod apparatus 250 that is bottomless and includes a reusable ring structure 40 and optionally a reusable lid 60 or 80. The reusable ring structure 40 may be referred to herein simply as "reusable ring." Reusable ring 40 is formed of any suitable size, shape, and design and is configured to provide a reusable bottomless structure which can house and hold a single-use or multiple-use filter (e.g., 20) for purposes of single serve brewing.

Said another way, reusable ring 40 is configured to couple to a filter 20, utilize the filter for a single brewing process, and subsequently detach from the filter 20 in an easy and efficient manner. Then, reusable ring 40 is also configured to couple again to the filter 20 (if it is reusable) or to a new filter (in case of single-use filters) for purposes of brewing another and/or second single serve brew and/or single serve coffee. In this way, the reusable ring 40 is designed and configured to be used over and over in an easy to use, quick and efficient manner.

In the arrangement shown, as one example, reusable ring 40 is generally ring and/or circumferential in shape and has a top 42 and a bottom 44. The ring 40 extends a perimeter and/or loop having a slender exterior surface 46 and a generally thin interior surface 48.

In the arrangement shown, as one example, the reusable ring 40 is primarily made of a polymer. However, other materials are hereby contemplated for use, and may include metal and the like to be used in the attachment features of the reusable ring and/or a combination of various materials. Other materials might include, but are not limited to, polymers, enhanced polymers, metal, metal alloys, glass, enhanced glass, other materials, a combination thereof and the like.

Lip Feature of Reusable Ring: In the arrangement shown, as one example, the reusable ring 40 also includes a top lip 50. Top lip 50 is formed of any suitable size, shape, and design and is configured to fit within close and tight tolerances of the lip 32 of the filter 20. In this way, the filter 20 and/or the lip 32 of the filter 20 can be engaged with the lip 50 of the reusable ring 40 so that the filter 20 sits on top of the reusable ring 40 without slipping through the bottom or disengaging with the ring. In this way, filter 20 can be easily placed within reusable ring 40. Similarly, filter 20 can be easily disengaged from the reusable ring 40 when the brewing process is complete. In this way, the filter 20 can be quickly engaged for single cup brewing, and then quickly ejected and/or discarded when the user is finished with the filter 20 and/or the ingredients and/or coffee grounds within the filter 20.

Attachment Feature of Reusable Ring: Furthermore, and in the arrangement shown, as one example, the reusable ring 40 includes an attachment feature 52. Attachment feature 52 is formed of any suitable size, shape, and design and is configured to operably connect the reusable ring 40 to a reusable lid 60 and/or to a reusable lid alternative 80 (to be further discussed herein). In the arrangement shown, as one example, the attachment feature includes a hinged connection for operably connecting the reusable ring 40 to the reusable lid 60/80. However, other types of operable connections are hereby contemplated for use.

Catch Feature: In the arrangement shown, as one example, reusable ring 40 also includes a primary catch feature 54. Primary catch feature 54 is formed of any suitable size, shape, and design and is configured to engage the reusable lid 60/80 (to be further described herein) with the reusable ring 40. Additionally, the catch feature 54 and/or primary catch 54 engages the reusable lid 60/80 with the reusable ring 40 in such a way as to squeeze the lip 32 of the filter 20 between the reusable ring 40 and the reusable lid 60/80 that the filter 20 is held in place more so than without the use of a reusable lid 60/80.

In the arrangement shown, as one example, the reusable lid 40 of system 10 includes a primary catch feature 54. However, in an alternative embodiment, no catch feature is required. In this way, the system functions without the primary catch feature. In yet another alternative embodiment, the reusable lid 40 of system 10 includes only the first catch feature and the second catch feature, and no primary catch feature. In yet another alternative embodiment, reusable lid of system 10 includes only a first catch feature and no primary catch feature or secondary catch feature. In yet another alternative embodiment, the reusable lid 40 of system 10 includes a second catch feature and no first catch feature or primary catch feature. In yet another alternative embodiment, reusable lid 40 of system 10 includes additional and/or alternative catch features.

The catch feature 54, in the arrangement shown, engages by frictional slipping and causes a small latch and/or small ledge to engage after the pliable material of the catch is forced outward to disengage. Once the reusable lid 60/80 has moved past the latch extension of the catch 54, the catch 54 reengages due to the frictional shape of the catch. The user can then press the catch to cause a pliable release when the user wishes to disengage the reusable lid 60/80. Other forms of a catch 54 are hereby contemplated for use and include, but are not limited to, a button release feature, a frictional fit, a snap fit, and the like.

In the arrangement shown, as one example, the reusable ring 40 and the reusable lid also include a plurality of secondary catch features which further aid in the frictional engagement of the reusable lid 60/80 with the reusable ring 40. In the arrangement shown, as one example, the reusable ring 40 includes a first side catch feature 56 spaced in approximately equal relation to the attachment feature 52 of the reusable ring 40 and the primary catch feature 54 of the ring. Similarly, and on the opposite side of the reusable ring 40, the reusable ring 40 includes a second side catch feature 58 which is approximately equally spaced between the primary catch feature 54 and the attachment feature 52 of the reusable ring 40.

In this way, the reusable ring 40 is configured to repeatedly engage and disengage with the reusable lid 60/80 while securely fitting in close and tight tolerances a filter 20. In this way, filter 20 is also prevented from moving about during the brewing process and the like. Other additional features to prevent movement during brewing and the like are further described herein.

In the arrangement shown, as one example, the primary catch feature is shown on the front of the reusable ring. However, the primary catch features may be along the side and are also shown along the two sides as two primary catch features. In this way, no front catch feature would need to be used. However, a plurality of catch features placed anywhere on the reusable ring are hereby contemplated for use. Furthermore, the catch features, as arranged on each side can be pressed and/or pinched by force to release the lid. This aids in ease of use and functionality.

Grip Feature: In the arrangement shown, as one example, the reusable ring 40 also includes a filter grip feature 59 or grip feature 59. Grip feature 59 is formed of any suitable size, shape, and design and is configured to provide an additional frictional grip and/or pressure surface to retain the filter 20 in place when being utilized and/or engaged with the reusable ring 40.

In the arrangement shown, as one example, grip feature 59 is a foam ring which extends as a circle when viewed from the top for the entire circumference of the reusable ring. In this way, as configured in the example shown, the grip feature 59 is configured to engage the lip 32 of the filter 20. In this way, the grip feature 59, when activated by squeezing the lip 32 of the filter 20 between the reusable lid 60/80 and the reusable ring 40, the filter 20 becomes securely in place. In the arrangement shown, as one example, the grip feature 59 may be foam and/or rubber and/or another material with a slight pliability to it so as to allow for some deformation. However, the grip feature 59 may also be fairly rigid but so as to accept a force of the reusable lid and engagement of the reusable lid 60/80 with the reusable ring 40.

In the arrangement shown, as one example, the reusable ring 40 is generally circular in shape when viewed from the top. The reusable ring 40 is generally formed in this shape to accommodate a majority of single serve brewing systems. However, other shapes are also hereby contemplated for use. Other shapes for the reusable ring 40 include, but are not limited to, circular with a single flat sidewall, square in shape, triangular in shape, oval in shape, elliptical in shape, conical in shape, bucket like in shape, disc like in shape, a combination thereof, and the like.

In the arrangement shown, as one example, a plurality of reusable rings 40 can be implemented. While only one reusable ring might be utilized, several reusable rings 40 can potentially be utilized in the various methods of use. For example, while one reusable ring 40 is being used in the brewing process, another reusable ring 40 may be assembled in the single serve pod assembly apparatus 100 (to be further described herein).

Figure 15:
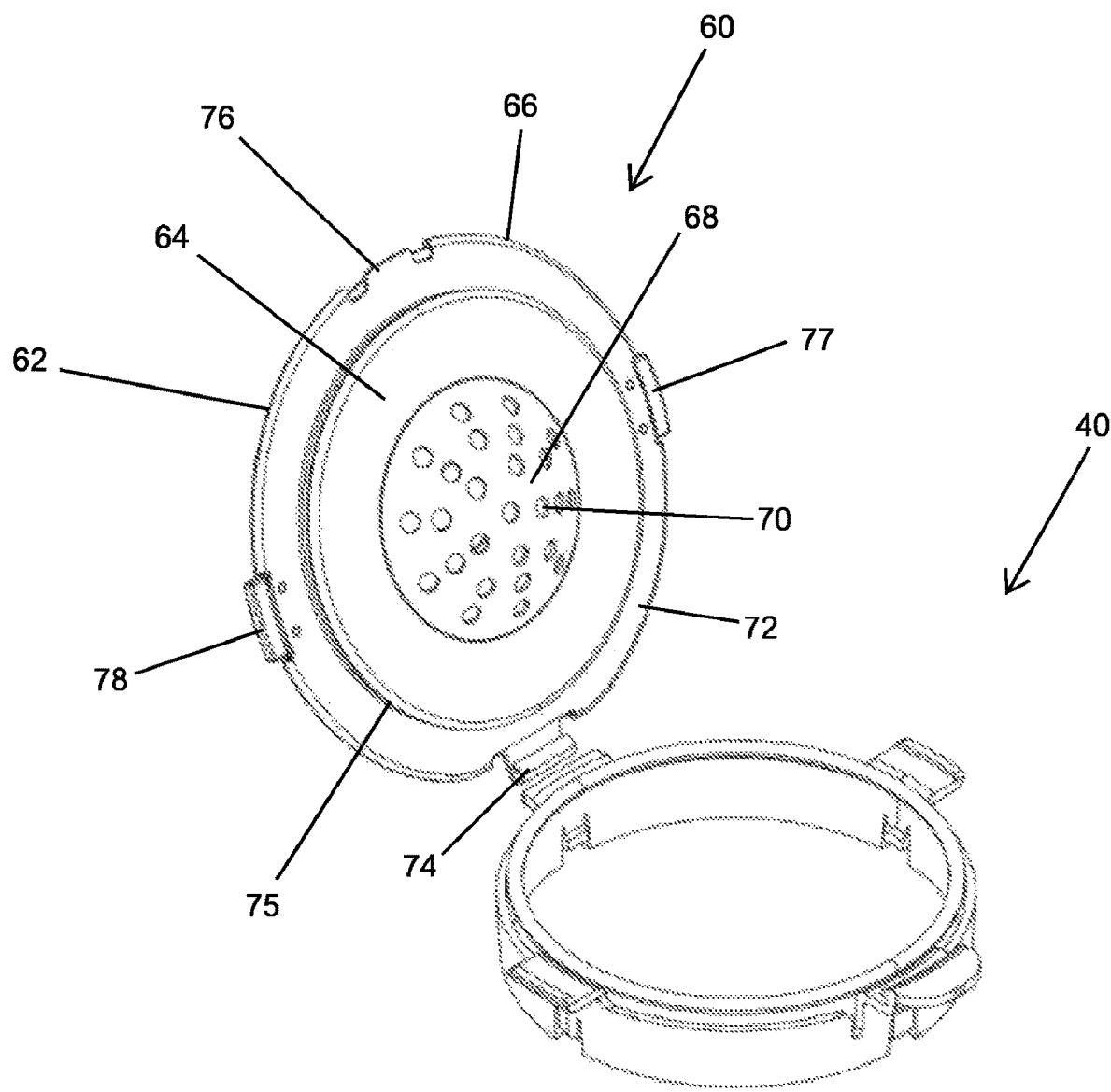
FIG. 15 is a diagram of an example of a reusable pod apparatus, in accordance with aspects of the present disclosure.

Reusable Lid:

In the arrangement shown, as one example, and with reference also to FIG. 15, the system 10 includes a reusable lid 60 (which may be referred to herein as an "enclosure", a "percolator", a "filter grip", a "reusable top", or simply a "lid"). Reusable lid 60 is formed of any suitable size, shape, and design and is configured to securely enclose the top of the reusable ring 40. Furthermore, in the arrangement shown, as one example, reusable lid 60 is configured to distribute and/or percolate water and/or liquid into the interior of the reusable ring 40 and/or filter 20.

In the arrangement shown, as one example, reusable lid 60 is generally circular in shape when viewed from the top 62. The reusable lid 60 includes a bottom 64 which may protrude into the interior of the reusable ring 40 when in the closed position and/or engaged position. The reusable lid 60 also includes a slender exterior surface 66 around the perimeter of the reusable lid 60. Furthermore, the reusable lid includes a percolator 68 having a plurality of apertures 70 for the distribution of liquids evenly over the ingredients on the interior of the filter 20, when engaged. Furthermore, a single aperture may be used to provide delivery of contents into the filter 20.

In the arrangement shown, as one example, the reusable lid 60 also includes a bottom lip 72. Bottom lip 72 is formed to engage the lip 32 of the filter 20 and squeeze the lip 32 of the filter 20 in between the reusable lid 60 and the lip 54 of the reusable ring 40. In this way, and in the arrangement shown, as one example, the bottom lip 72 is sized and shaped to appear and/or accommodate the lip 32 of the filter 20 in close and tight tolerances. The cavity 30 of the filter 20 extends through the reusable ring 40.

Attachment Feature: In the arrangement shown, as one example, the reusable lid 60 also includes attachment features 74. Attachment feature 74 is formed of any suitable size, shape, and design and is configured to operably connect the reusable lid 60 to a reusable ring 40. In the arrangement shown, as one example, the attachment feature 74 includes a hinged connection for operably connecting the reusable ring 40 to the reusable lid 60. However, other types of operable connections are hereby contemplated for use.

In the arrangement shown, as one example, the reusable lid 60 also includes an interlocking extension feature 75. Interlocking extension feature 75 is formed of any suitable size, shape, and design and is configured to interlock and/or provide additional fitting and attachment features with the reusable lid 40. In the arrangement shown, as one example, the interlocking extension feature 75 is a small step feature with frictional fit components and/or rubber fit components which cause engagement with the reusable lid 40.

Catch Feature of the Reusable Lid: In the arrangement shown, as one example, reusable lid 60 also includes a primary catch feature 76. Primary catch feature 76 is formed of any suitable size, shape, and design and is configured to engage the primary catch feature 56 of the reusable lid 40. In the arrangement shown, as one example, the primary catch feature 76 of the reusable lid 60 is formed of a small extension and/or arm piece which can be grabbed by the primary attachment feature 54 of the reusable ring 40. Additionally, and said another way, the catch feature 76 and/or primary catch 76 engages with the reusable ring 40 in such a way as to squeeze the lip 32 of the filter 20 between the reusable ring 40 and the reusable lid 60 such that the filter 20 is held in place more so than without the use of a reusable lid 60.

The catch feature 76, in the arrangement shown, engages by frictional slipping and causes a small latch and/or small ledge to engage with the catch feature of the reusable ring 40 after the pliable material of the catch is forced outward to disengage. Once the primary catch feature 76 of the reusable lid 60 has moved past the latch extension of the catch 54, the catch 76 reengages due to the frictional shape of the catch 76, which is an extension outward from the center of the reusable lid 60. The user can then press the catch to cause a pliable release when the user wishes to disengage the reusable lid 60. Other forms of a catch 76 are hereby contemplated for use and include, but are not limited to, a button release feature, a frictional fit, a snap fit, and the like.

In the arrangement shown, as one example, the reusable lid 60 also includes a plurality of secondary catch features 77 and 78, which further aid in the frictional engagement of the reusable lid 60 with the reusable ring 40. In the arrangement shown, as one example, the reusable lid 60 includes a first side catch feature 77 spaced in approximately equal relation to the attachment feature 74 of the reusable lid 60 and the primary catch feature 76 of the reusable ring 60. Similarly, and on the opposite side of the reusable lid 60, lid 60 includes a second side catch feature 78 which is approximately equally spaced between the primary catch feature 76 and the attachment feature 74 of the reusable ring 60.

Grip Feature of Alternative Embodiment: In an alternative embodiment, the reusable lid 60 may also include a grip feature. In this way, an alternative grip feature is a foam ring which extends as a circle when viewed from the top for the entire circumference of the ring. In this way, as configured in the example shown, the grip feature is configured to engage the lip 32 of the top of the filter 20. In this way, the grip feature of the reusable lid 60, when activated by squeezing the lip 32 of the filter 20 between the reusable lid 60 and the reusable ring 40, the filter becomes securely in place. In this alternative arrangement, as one example, the grip feature may be foam and/or rubber and/or another material with a slight pliability to it so as to allow for some deformation. However, the grip feature may also be fairly rigid but so as to accept a force of the lid and engagement of the reusable lid 60 with the reusable ring 40. Furthermore, in this way, the grip feature is configured to easily open and/or close the reusable lid in concert with the reusable ring.

In the arrangement shown, as one example, the reusable lid 60 is generally circular in shape when viewed from the top. The reusable lid 60 is generally formed in this shape to accommodate a majority of single serve brewing devices. However, other shapes are also hereby contemplated for use. Other shapes for the reusable lid 60 may include, but are not limited to, circular with a single flat sidewall, square in shape, triangular in shape, oval in shape, elliptical in shape, conical in shape, bucket like in shape, disc like in shape, a combination thereof, and the like. Furthermore, in this way, the reusable lid 60 may be similar or different in shape than the reusable ring 40.

In the arrangement shown, as one example, a plurality of reusable rings 40 can be implemented. However, a reusable lid 60 may not be required in an alternative embodiment. In this way, zero reusable lids 60 would be utilized in one embodiment and/or method of the present disclosure. Additionally, while only one reusable ring might be utilized, several reusable lids 60 can potentially be utilized in the various methods of use. For example, while one reusable lid 60 is being used in the brewing process, another reusable lid 60 may be assembled in the single serve pod assembly apparatus 100 (to be further described herein).

Figure 16:
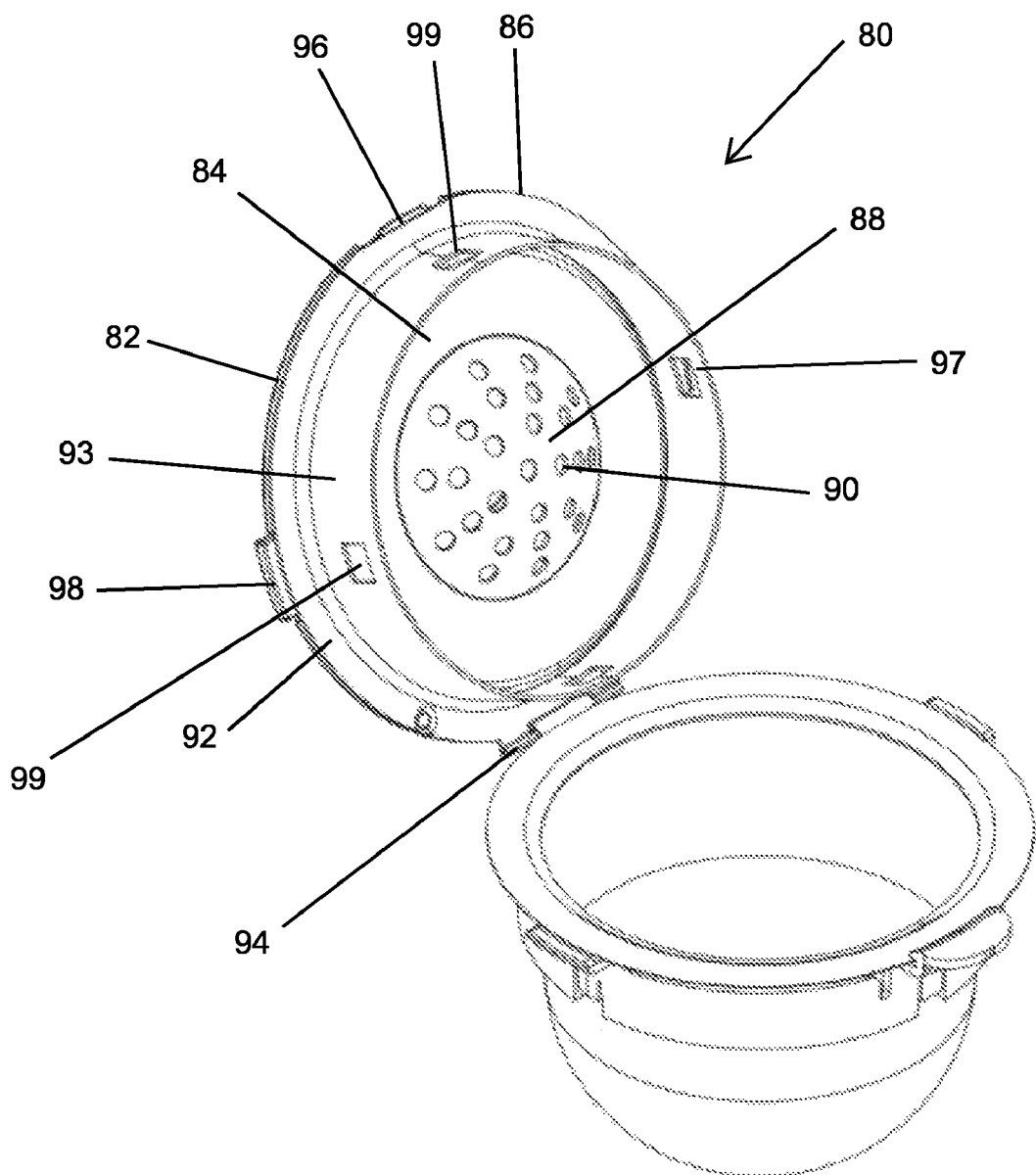
FIG. 16 is a diagram of an example of an assembled single serve pod that includes the reusable pod apparatus of FIG. 15 together with the filter of FIG. 14, in accordance with aspects of the present disclosure.
Figure 17:
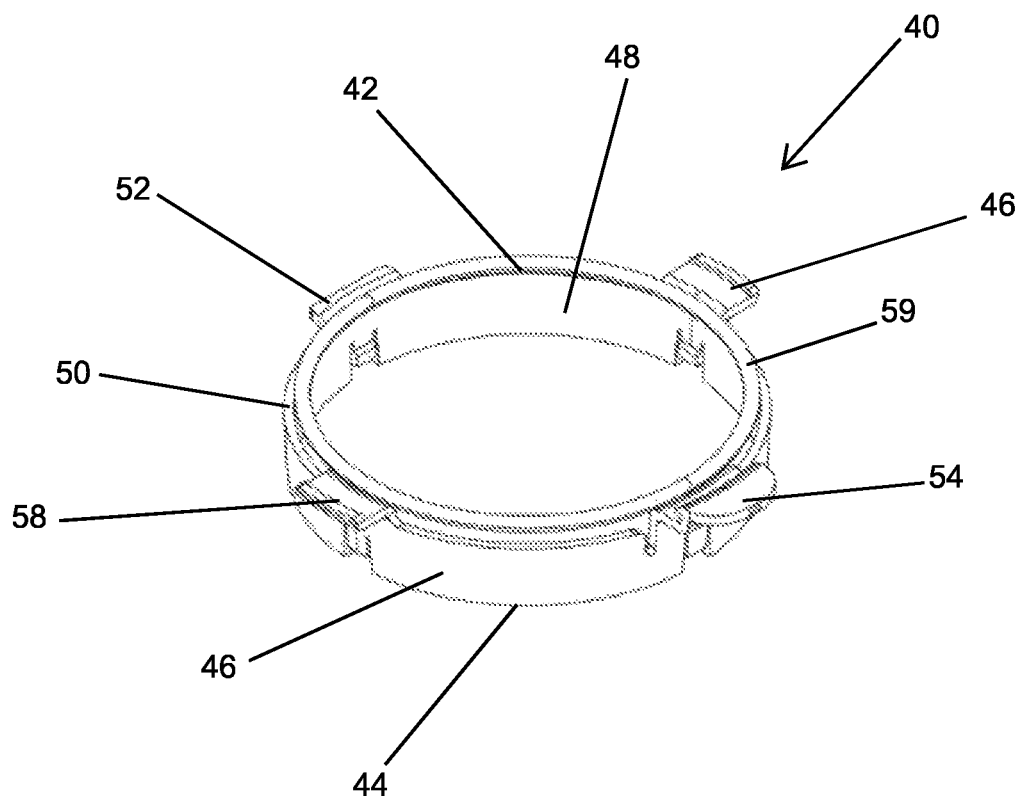
FIG. 17 is a diagram of an example of a reusable ring, in accordance with aspects of the present disclosure.
Figure 18:
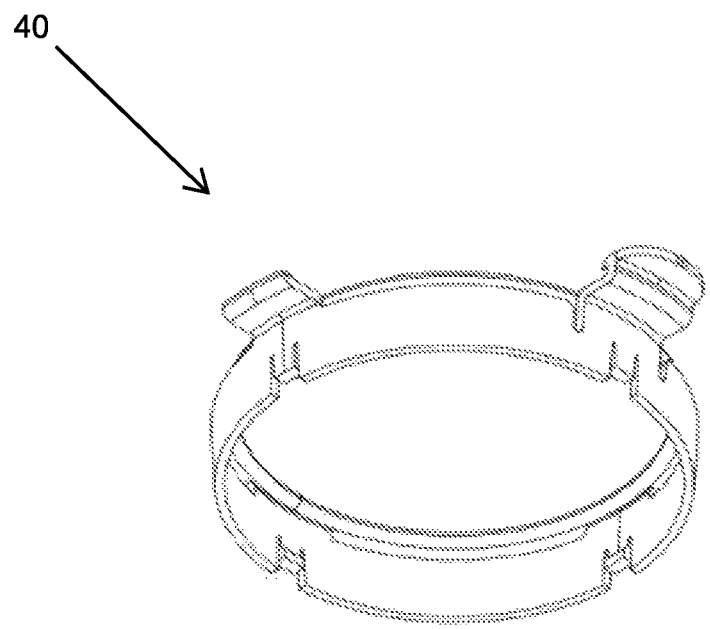
FIG. 18 is a bottom, perspective view of the reusable ring of FIG. 17, in accordance with aspects of the present disclosure.

Alternative Reusable Lid:

In the arrangement shown, as another example, and with reference also to FIG. 16, system 10 also includes an alternative reusable lid 80 (also referred to as an "enclosure", a "percolator", a "filter grip", a "reusable top", or simply a "lid"). Reusable lid 80 is formed of any suitable size, shape, and design and is configured to enclose the top of the reusable ring 40. Furthermore, in the arrangement shown, as one example, reusable lid 80 is configured to distribute and/or percolate water and/or liquid into the interior of the reusable ring 40 and/or filter 20.

In the arrangement shown, as one example, reusable lid 80 is generally circular in shape when viewed from the top 82. The reusable lid 80 includes a bottom 84 which may protrude into the interior of the reusable ring 40 when in the closed position and/or engaged position. The reusable lid 80 also includes a slender exterior surface 86 around the perimeter of the reusable lid 80. Furthermore, the reusable lid 80 includes a percolator 88 having a plurality of apertures 90 for the distribution of liquids evenly over the ingredients on the interior of the filter 20, when engaged.

In the arrangement shown, as one example, the percolator 88 is shown having multiple apertures. However, another alternative embodiment, as is shown, includes a percolator 88 which only has a single aperture. While one aperture is contemplated for use in this embodiment, a plurality of apertures is hereby contemplated for use, in use with the percolator 88. This includes but is not limited to, one aperture, two apertures, three apertures, four apertures, five apertures, six apertures, seven apertures, eight apertures, nine apertures, or more apertures.

In the arrangement shown, as one example, the reusable lid 80 also includes a bottom lip 92. Bottom lip 92 is formed to engage the lip 32 of the filter 20 and squeeze the lip 32 of the filter 20 in between the reusable lid 80 and the lip 54 of the reusable ring 40. In this way, and in the arrangement shown, as one example, the bottom lip 92 is sized and shaped to appear and/or accommodate the lip 32 of the filter 20 in close and tight tolerances. The cavity 30 of the filter 20 extends through the reusable ring 40.

Attachment Feature: In the arrangement shown, as one example, the reusable lid 80 also includes attachment features 94. Attachment feature 94 is formed of any suitable size, shape, and design and is configured to operably connect the reusable lid 80 to a reusable ring 40. In the arrangement shown, as one example, the attachment feature 94 includes a hinged connection for operably connecting the ring 40 to the reusable lid 80. However, other types of operable connections are hereby contemplated for use.

In the arrangement shown, as one example, lid 80 also includes an interlocking extension feature 93. Interlocking extension feature 93 is formed of any suitable size, shape, and design and is configured to interlock and/or provide additional fitting and attachment features with the reusable lid 40. In the arrangement shown, as one example, the interlocking extension feature 93 is a circular extension which extends downward from the reusable lid 80 and provides for additional attachment features. The extension and/or interlocking extension feature can more securely attached to the reusable lid 80 by providing small apertures for features of the reusable lid 80 to engage with, while also providing frictional fit components and/or rubber fit components which cause engagement with the reusable lid 80.

Sub catch features of Alternative Reusable Lid: In the arrangement shown, as one example, the reusable lid 80 also includes additional sub-catch features 99. Sub-catch features 99, as shown in FIG. 16, are small apertures equally spaced around the perimeter of the extension feature. The sub-catch features 99 are designed to accept small extensions from the reusable lid so as to frictionally engage into the interior of the sub-catch features. In the arrangement shown, as one example, four sub-catch features are shown, however any other number of sub-catch features is hereby contemplated for use.

Catch Feature of the Reusable Lid: In the arrangement shown, as one example, reusable lid 80 also includes a primary catch feature 96. Primary catch feature 96 is formed of any suitable size, shape, and design and is configured to engage the primary catch feature 56 of the reusable lid 40. In the arrangement shown, as one example, the primary catch feature 96 of the reusable lid 80 is formed of a small extension and/or arm piece which can be grabbed by the primary attachment feature 54 of the reusable ring 40.

Additionally, and said another way, the catch feature 96 and/or primary catch 96 engages with the reusable ring 40 in such a way as to squeeze the lip 32 of the filter 20 between the reusable ring 40 and the reusable lid 80 such that the filter 20 is held in place more so than without the use of a reusable lid 80.

The catch feature 96, in the arrangement shown, engages by frictional slipping and causes a small latch and/or small ledge to engage with the catch feature of the reusable ring 40 after the pliable material of the catch is forced outward to disengage. Once the primary catch feature 96 of the reusable lid 80 has moved past the latch extension of the catch 54, the catch 96 reengages due to the frictional shape of the catch 96, which is an extension outward from the center of the reusable lid 80. The user can then press the catch to cause a pliable release when the user wishes to disengage the reusable lid 80. Other forms of a catch 96 are hereby contemplated for use and include, but are not limited to, a button release feature, a frictional fit, a snap fit, and the like.

In the arrangement shown, as one example, the reusable lid 80 also includes a plurality of secondary catch features 97 and 98, which further aid in the frictional engagement of the reusable lid 80 with the reusable ring 40. In the arrangement shown, as one example, the reusable lid 80 includes a first side catch feature 97 spaced in approximately equal relation to the attachment feature 94 of the reusable lid 80 and the primary catch feature 96 of the reusable ring 80. Similarly, and on the opposite side of the reusable lid 80, lid 80 includes a second side catch feature 98 which is approximately equally spaced between the primary catch feature 96 and the attachment feature 94 of the reusable ring 80. Furthermore, in this way, the grip feature is configured to easily open and/or close the lid in concert with the reusable ring.

Grip Feature of Alternative Embodiment: In an alternative embodiment, the reusable lid 80 may also include a grip feature. In this way, an alternative grip feature is a foam ring which extends as a circle when viewed from the top for the entire circumference of the ring. In this way, as configured in the example shown, the grip feature is configured to engage the lip 32 of the top of the filter 20. In this way, the grip feature of the reusable lid 80, when activated by squeezing the lip 32 of the filter 20 between the lid 80 and the reusable ring 40, the filter 20 becomes securely in place. In this alternative arrangement, as one example, the grip feature may be foam and/or rubber and/or another material with a slight pliability to it so as to allow for some deformation. However, the grip feature may also be fairly rigid but so as to accept a force of the lid and engagement of the reusable lid 80 with the reusable ring 40.

In the arrangement shown, as one example, the reusable lid 80 is generally circular in shape when viewed from the top. The reusable lid 80 is generally formed in this shape to accommodate a majority of single serve brewing devices. However, other shapes are also hereby contemplated for use. Other shapes for the reusable lid 80 may include, but are not limited to, circular with a single flat sidewall, square in shape, triangular in shape, oval in shape, elliptical in shape, conical in shape, bucket like in shape, disc like in shape, a combination thereof, and the like. Furthermore, in this way, the reusable lid 80 may be similar or different in shape than the reusable ring 40.

In the arrangement shown, as one example, a plurality of reusable rings 40 can be implemented. However, a reusable lid 80 may not be required in an alternative embodiment. In this way, zero reusable lids 80 would be utilized in one embodiment and/or method of the present disclosure. Additionally, while only one reusable ring might be utilized, several reusable lids 80 can potentially be utilized in the various methods of use. For example, while one lid 80 is being used in the brewing process, another reusable ring 80 may be assembled in the reusable pod apparatus (to be further described herein).

Single Serve Pod Assembly Apparatus:

In the arrangement shown, as one example, and with reference to FIGS. 1-12, system includes a single serve pod assembly apparatus 100 (which may be referred to as an "assembly apparatus" or simply an "apparatus"). Single serve pod assembly system 100 is formed of any suitable size, shape, and design and is configured to provide ease and efficient assembly of a single serve pod 200 without the need for cleaning, or the like.

Said another way, and in the arrangement shown, as one example, assembly apparatus 100 is designed and configured to provide various components for easily assembling and/or preparing a single serve pod 200 for brewing. In the arrangement shown, as one example, a user engages the assembly apparatus 100 by first removing a reusable ring 40 from the side hooks. Subsequently, a user will grab a single-use or multiple-use filter 20 from the filter dispenser of the assembly apparatus 100 (to be further described herein). A user then can place the filter 20 into the reusable ring 40. Alternatively, a user will place the reusable ring 40 into the assembly station 120 (to be further described herein) of the assembly apparatus 100.

Once the reusable ring 40 is placed into the assembly station 120, a user will place a filter 20 (after removing from the filter dispenser) into the reusable ring 40. Once the filter 20 is in place, a user will open the storage container 160 (to be further discussed herein) and use a coffee scoop to scoop coffee grounds and/or other ingredients into the hollow interior/cavity of the filter. Subsequently a user will close the reusable lid 60/80. The user can then place the assembled single serve pod 200 into a single serve brewing device (not shown). Once completed, the filter and contents can simply be removed, and the reusable ring 40 replaced onto a storage hook or within the assembly station of the assembly apparatus 100. Furthermore, and in one example, a custom coffee scoop which is formed and designed to fit along the side of and hook onto the top of system 10 is also hereby contemplated for use. In this way, the coffee scoop can be easily removed, used, and re-stored. In this way, the assembly apparatus 100 is configured to make assembly of a single serve device easy, quick, clean, efficient, environmentally friendly, and fun.

In the arrangement shown, as one example, with continuing reference to FIGS. 1-12, the assembly apparatus 100 includes an upper portion 110, an assembly station 120, a filter dispenser 130, a lower portion 150, a storage container 160, and a storage container housing 180, among other features, components, and functionality.

Furthermore, and in the arrangement shown, as one example, the assembly apparatus 100 extends from a top 102 to a bottom 103 between opposing sides 104. The assembly apparatus 100, in the arrangement shown, as one example, also extends a length from a front 105 to a back 106 or rear 106. In the arrangement shown, as one example, the assembly apparatus 100 has an exterior surface 107 and an interior surface 108, as well as a hollow interior 109. The hollow interior 109 of the assembly apparatus 100 is configured to house and hold various components (as is further described herein).

In the arrangement shown, as one example, the assembly apparatus 100 is formed of a polymer such as a plastic, an enhanced polymer, thermoplastics, an elastomer, polyvinyl chloride, a polyethylene, a synthetic, or the like. Other materials also include wood, metal, metal alloys, carbon fiber, glass, fiberglass, stainless steel, rubbers, silicone, aluminum, a combination thereof, and the like.

Upper Portion of Assembly Apparatus:

In the arrangement shown, as one example, the assembly apparatus 100 includes an upper portion 110. Upper portion 110 is formed of any suitable size, shape, and design, and is configured as the top portion of the assembly apparatus 100. In the arrangement shown, as one example, the upper portion is generally rectangular in shape when viewed from the top and extends a length from a front 111 to a back 112 between opposing sides 113.

In the arrangement shown, as one example, the upper portion includes the assembly station (to be further discussed herein) and is the primary location where assembly of the single serve pod can take place. In the arrangement shown, as one example, the upper portion includes a sloping top design followed by a curve and flattened upper surface to house the assembly station. In this way, the upper portion may include an angled surface 114 and a flat surface 115.

In the arrangement shown, as one example, the upper portion 110 is formed of a polymer such as a plastic, an enhanced polymer, thermoplastics, an elastomer, polyvinyl chloride, a polyethylene, a synthetic, or the like. Other materials also include wood, metal, metal alloys, carbon fiber, glass, fiberglass, stainless steel, rubbers, silicone, aluminum, a combination thereof, and the like.

Assembly Station of Assembly Apparatus:

In the arrangement shown, as one example, the assembly apparatus 100 includes an upper portion 110 which houses an assembly station 120. Assembly station 120 is formed of any suitable size, shape, and design and is configured to provide an easy holding area for the single serve pod 200 during assembly of the single serve pod 200. In order to achieve this the assembly station 120 consists primarily of a cavity or assembly cavity 121 in the flat surface 115 of the upper portion 110 of the assembly apparatus 100.

In the arrangement shown, as one example, in addition to the assembly cavity 121 which is sized and configured to hold steadily the reusable ring 40, a filter 20, the assembly station also includes access features for ease of placing and lifting the various components of the single serve pod. Also known as finger grip apertures 122, these features appear as cavity shapes in the flat surface 115 of the upper portion 110 of the assembly apparatus 100. The finger grip apertures 122 are on each side, and adjacent to the assembly cavity so as to allow a user to easily remove and/or place components into the assembly cavity 121.

In one arrangement, and as shown in the example, assembly cavity 121 is formed and configured to hold and/or position the lid in an optimal position for ease of assembly. In this way, and in one example, the assembly cavity 121 is configured to hold the lid in an approximate obtuse angled position for ease of assembly. Other angles are also hereby contemplated for use.

Filter Dispenser of Assembly Apparatus:

In the arrangement shown, as one example, the assembly apparatus 100 includes a filter dispenser 130. Filter dispenser 130 is formed of any suitable size, shape, and design and is configured to provide quick and easy dispensing of the filter 20 disclosed herein. Furthermore, the filter dispenser 130 is configured to house and hold a plurality of filters 20, so as to dispense one after another.

In the arrangement shown, as one example, the filter dispenser 130 extends from the front 131, where the plurality of filters 20 are dispensed, to a rear 132, where the plurality of filters 20 can be loaded and/or filled and/or refilled into the hollow tube 133—which extends in between the front 131 and the rear 132. The rear 132 also includes a refill door 134 which provides access to the hollow interior of the hollow tube 133, so the filters can be filled and/or refilled within. Additionally, and in the arrangement shown, the filter dispenser 130 includes a dispenser 136 at the front 131, a plurality of dispenser catches 138 and a grab aperture 140 which all are configured to hold a plurality of filters 20 and dispense the filters 20 with ease.

In the arrangement shown, as one example, the filter dispenser 130 includes a refill door 134. Refill door 134 is formed of any suitable size, shape, and design and is configured to provide access to the hollow tube 133 of the filter dispenser 130. In this way, the hollow tube 133 of the filter dispenser 130 can be refilled and or filled with a plurality of features. In an alternative embodiment, filter dispenser 130 does not include a refill door 134. In this alternative embodiment, the plurality of filters 20 are refilled and/or filled from the front 131 of the filter dispenser 130. In this way, and in this alternative embodiment, the filter dispenser may include a spring or other features which cause the plurality of filters to move forward. In the arrangement shown, the filters are additionally caused to move forward by gravity and a downward slope of the hollow tube 133 of the filter dispenser 130.

Furthermore, and in another alternative embodiment, the refill dispenser does not include a refill door 134 on the rear 132 of the filter dispenser 130. However, alternative means of access and refill and/or fill of the hollow tube 133 of the filter dispenser 130 are hereby contemplated for use. Alternative means of refilling the filter dispenser 130 and/or filling the filter dispenser 130 may include, but are not limited to, causing the filter dispenser 130 to be filled from the front, rear openings, side openings, top openings, an upward opening upper portion, a combination thereof, or the like.

Lower Portion of Assembly Apparatus:

In the arrangement shown, as one example, the assembly apparatus 100 includes a lower portion 150. Lower portion 150 is formed of any suitable size, shape, and design, and is configured as the bottom portion of the assembly apparatus 100. In the arrangement shown, as one example, the lower portion is generally rectangular in shape when viewed from the bottom and extends a length from a front 152 to a back 154 between opposing sides 156.

In the arrangement shown, as one example, the lower portion 150 includes the storage container (to be further discussed herein) and is the primary location where storage of coffee beans, coffee grounds, other brewing ingredients, a combination thereof, or the like, can take place. In the arrangement shown, as one example, the lower portion 150 includes a tapering side design. In this way, the lower portion 150 may include a curved surface 158. Furthermore, the lower portion 150, at the bottom of the lower portion 150, may also include a plurality of feet 159 which serve for leveling, force absorption, anti-scratch, and other functionality.

Furthermore, and in the arrangement shown, as one example, the plurality of feet 159 may be formed of small pegs made of rubber and/or silicone with adhesive properties. In this way, the plurality of feet 159 are formed and configured to stabilize and/or maintain the location of system 10 while also reducing vibration and/or other forces applied to system 10 when in operation.

Furthermore, in the arrangement shown, as one example, a plurality of feet are shown. The plurality of feet are formed of a rubber and/or silicone. In the arrangement shown, the plurality of feet are attached to the lower portion 150 by an adhesive and form four feet. However, other materials for the composition of the feet such as plastic and the like are hereby contemplated for use. Additionally, while four feet are shown, any other number of feet are hereby contemplated for use. Additionally, while an adhesive is used for attachment, other forms of attachment are hereby contemplated for use including, but not limited to, fasteners, rivets, friction fit, and the like.

Furthermore, and in the arrangement shown, as one example, the bottom of the plurality of feet and/or a plurality of pegs for gripping are configured with an adhesive and/or gripping property. In this way, the plurality of feet and the configuration of the plurality of feet are formed and suitable to maintain the position of the system 10 on the countertop or other surface so that the system 10 does not move when in use.

In the arrangement shown, as one example, the lower portion 150 is formed of a polymer such as a plastic, an enhanced polymer, thermoplastics, an elastomer, polyvinyl chloride, a polyethylene, a synthetic, or the like. Other materials also include wood, metal, metal alloys, carbon fiber, glass, fiberglass, stainless steel, rubbers, silicone, aluminum, a combination thereof, and the like.

Storage Container of Assembly Apparatus:

In the arrangement shown, as one example, assembly apparatus 100 also includes a storage container 160 (also referred to as a "storage compartment", "compartment", or simply "container"). Storage compartment 160 is formed of any suitable size, shape and design and is configured to provide storage for coffee beans, coffee grounds, other brewing ingredients, a combination thereof, or the like. Furthermore, and in one arrangement as is hereby contemplated for use, the storage compartment is configured to provide an airtight seal and airtight storage for coffee beans, coffee grounds, and other brewing ingredients, a combination thereof, or the like. Furthermore, and in one arrangement as is hereby contemplated for use, the storage compartment is configured to provide a near airtight seal and near airtight storage for coffee beans, coffee grounds, and other brewing ingredients, a combination thereof, or the like.

In the arrangement shown, as one example, the storage container 160 extends a length from a front 162—having a handle 172 at the front—to a back 164 between opposing sides 166. The storage container, in the arrangement shown, as one example, has a single hollow interior 168. However, multiple different hollow interiors are hereby contemplated for use and the container 160 may have a plurality of compartments, each compartment having a unique airtight seal. Furthermore, in the arrangement shown, the storage container has an exterior surface 170 and a closing feature 174.

In the arrangement shown, as one example, the storage container 160 is housed within the lower portion 150 within the storage container housing 180 that provides unique opening and closing features as well as ease of cleaning functionality and the like.

Storage Container Housing of Assembly Apparatus: In the arrangement shown, as one example, the storage container 160 is enclosed within a storage container housing 180. The storage container housing 180 is formed of any suitable size, shape, and design, and is configured to provide functionality and ease of cleaning for the lower portion 150 and the storage container 160.

In the arrangement shown, as one example, the storage container housing extends a length from a front 182 to a back 184 between opposing sides 186. In the arrangement shown, as one example, the storage container housing includes a top 188 a bottom 190 and a catch feature 192, among other components, features, and functionality.

Other Features/Alternative Embodiments

In the arrangement shown, as one example, system 10 includes various features. Other features, in an alternative embodiment may include, but are not limited to a single serve brewer, an onboard computing device, various electrical components such as receivers and transceivers, power supplies, and the like, a grinder, an automated assembler with pre-determine rules for dispensing certain amounts, features for adjusting amounts ground and fineness and/or coarseness of grounds, ring storage, coffee bean storage, coffee grind storage, ground hopper storage, scooper storage, power supplies, a graphical user interface, a touch screen, and a mobile application, among other components, features, and functionality.

In addition to the above identified features, options, controls, and components, system may also include other features and functionalities, among other options, controls, and components.

In Operation:

In one example, as one method of use, assembly apparatus 100 is designed and configured to provide various components for easily assembling and/or preparing a single serve pod for brewing. In the arrangement shown, as one example, a user engages the assembly apparatus 100 by first removing a reusable ring 40 from the side hooks. Subsequently, a user will grab a single-use or multiple-use filter 20 from the filter dispenser of the assembly apparatus (to be further described herein). A user then can place the filter 20 into the reusable ring 40. Alternatively, a user will place the reusable ring 40 into the assembly station 120 (to be further described herein) of the assembly apparatus 100.

Once the reusable ring 40 is placed into the assembly station, a user will place a filter (after removing from the filter dispenser) into the reusable ring 40. Once the filter 20 is in place, a user will open the storage container 160 (to be further discussed herein) and use a coffee scoop to scoop coffee grounds and/or other ingredients into the hollow interior of the filter. Subsequently a user will close the reusable lid 60/80. The user can then place the assembled single serve pod 200 into a single serve brewing device (not shown). Once completed, the filter and contents can simply be removed, and the ring 40 replaced onto a storage hook or within the assembly station of the assembly apparatus 100. In this way, the assembly apparatus 100 is configured to make assembly of a single serve device easy, quick, clean, efficient, environmentally friendly, and fun.

Furthermore, in the arrangement shown, and method of use described, a user can effectively, quickly, and efficiently, dispose of the used coffee grounds and/or used filter and contents. The bottomless ring provides for easy disposal of the used filter and contents. This allows for quick disposal and/or minimal rinsing/cleaning prior to reusing the reusable ring with a new filter and contents for the brewing of another single serve and/or brewing of another single serve coffee. In this way, waste and/or used filters can be easily removed or fall out when released to a bin or the like. The unique design of system 10 provides for this quick disposal and/or clean up in the operation.

It will be appreciated by those skilled in the art that other various modifications could be made to the systems, apparatuses, processes, and methods of use without departing from the spirit and scope of this disclosure. For example, variations of a reusable pod apparatus are shown in FIGS. 19-26 and a variation of a single serve pod system is shown in FIGS. 27-30. All such and other modifications and changes fall within the scope of the present disclosure and are intended to be covered thereby.

Figure 19:
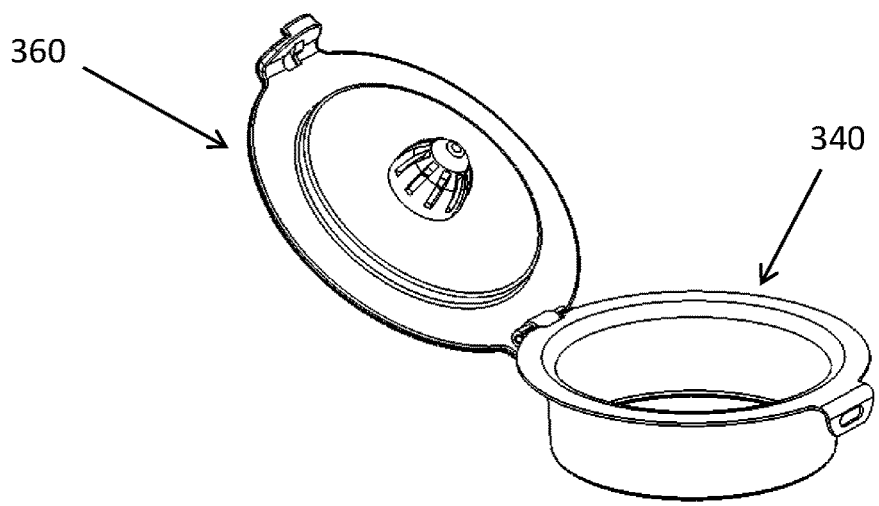
FIG. 19 is a diagram of another example of a reusable pod apparatus, in accordance with aspects of the present disclosure.

FIG. 19 is a diagram of another example of a reusable pod apparatus. The illustrated reusable pod apparatus 300 includes a reusable ring 340 and a reusable lid 360. The reusable ring 340 and the reusable lid 360 are coupled together by a catch features and an attachment features, which will be described in connection with FIG. 20. In FIG. 19, the reusable lid 360 is coupled with the reusable ring 340 in an open position. The reusable ring 340 is open and bottomless. In the open position, a filter (e.g., 20) may be placed into the opening of the reusable ring 340 and be supported by the reusable ring 340, while the cavity of the filter extends through the reusable ring 340. The reusable ring 340 and the reusable lid 360, and their respective components, may be sized, shaped, and otherwise configured to fit into the pod receptacle of various single serve brewing systems.

Figure 20:
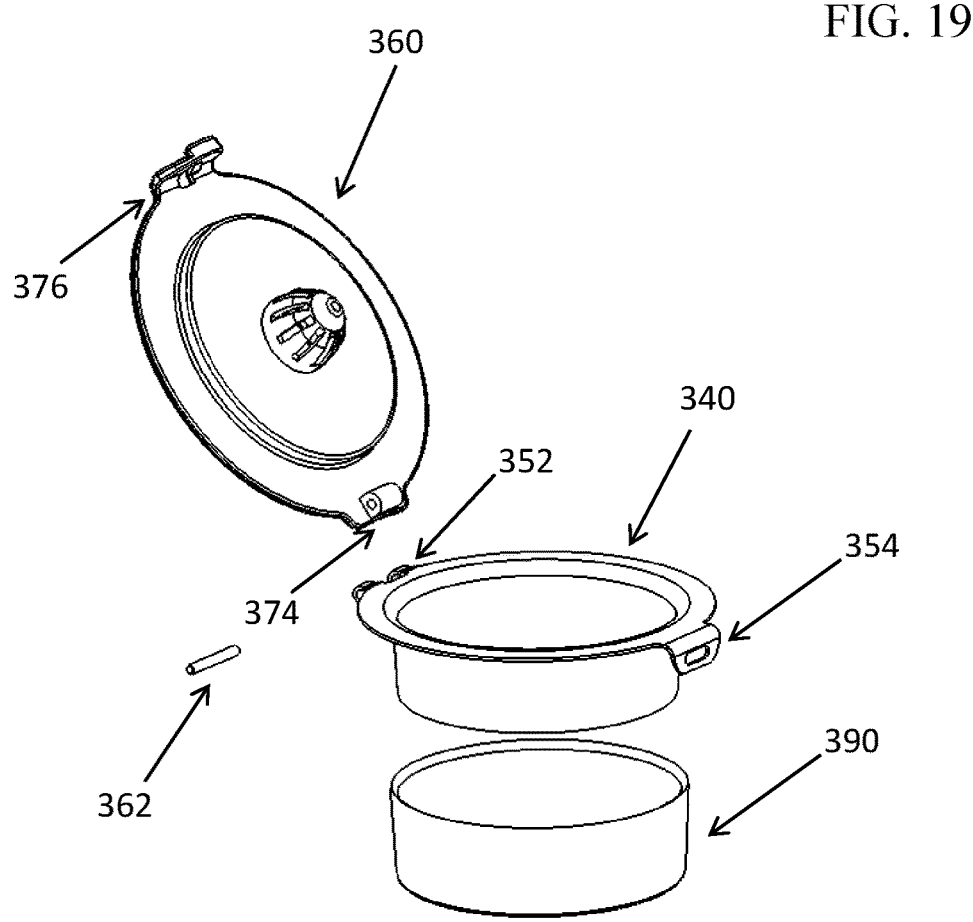
FIG. 20 is a diagram of components of the reusable pod apparatus of FIG. 19 in a disassembled state, in accordance with aspects of the present disclosure.

FIG. 20 is a diagram of components of the reusable pod apparatus of FIG. 19 in a disassembled state. The reusable ring 340 includes a catch feature 354 and an attachment feature 352. The catch feature 354 and the attachment feature 352 may have aspects of the catch feature 54 and the attachment feature 352, respectively, described above. All description relating to catch feature 54 and attachment feature 52 apply to the catch feature 354 and the attachment feature 352, respectively, as well. The reusable lid 360 includes a catch feature 376 and an attachment feature 374. The catch feature 376 and the attachment feature 374 may have aspects of the catch feature 76 and the attachment feature 74, respectively, described above. All description relating to catch feature 76 and attachment feature 74 apply to the catch feature 376 and the attachment feature 374, respectively, as well. A pin 362 secures the attachment feature 352 of the reusable ring 340 with the attachment feature 374 of the reusable lid 360. Engagement of the catch feature 354 of the reusable ring 340 with the catch feature 376 of the reusable lid 360 will be described in connection with FIG. 23. The reusable ring 340 may include an optional heat-resistant ring 390 that may be made from a heat-resistant material, such as silicone, among other materials. When the heat-resistant ring 390 is used, it shields the user's fingers from feeling heat to some degree when holding the reusable ring 340 after a brew.

Figure 21:
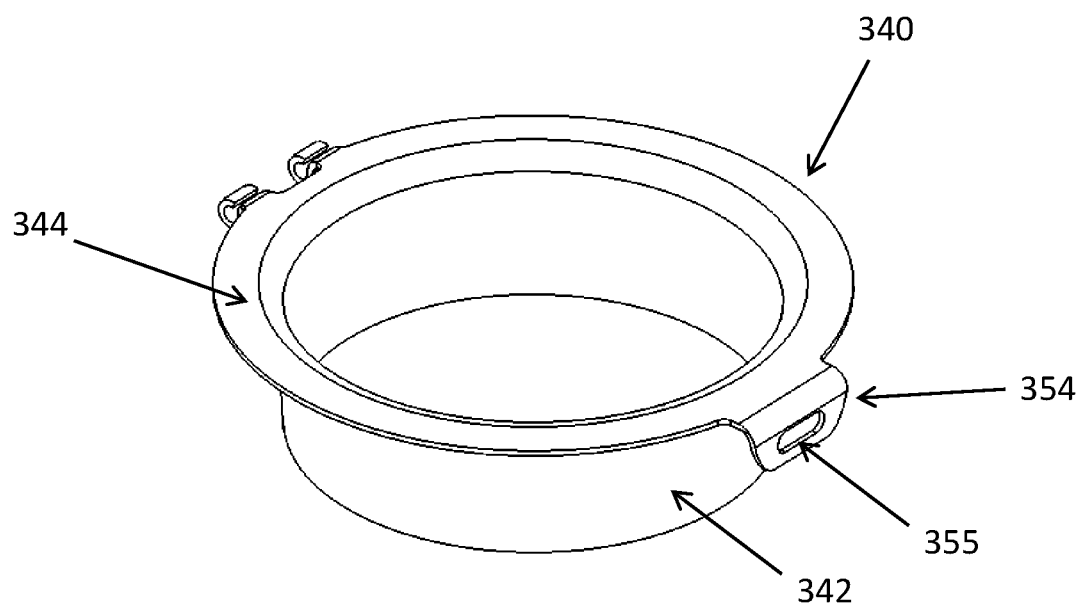
FIG. 21 is a top perspective view of the reusable ring in the reusable pod apparatus of FIG. 19, in accordance with aspects of the present disclosure.

FIG. 21 is a top perspective view of the reusable ring 340 in the reusable pod apparatus of FIG. 19. The reusable ring 340 includes a ring body 342 and a rim 344. The rim 344 is sized and shaped to support a filter, and the filter cavity extends through the ring body 342. The catch feature 354 extends from the rim 344, and an end portion of the catch feature 354 extends in the same direction as the ring body 342. The catch feature 354 includes a slot 355 that operates to receive a tab of the catch feature 376 of the reusable lid 360 and to secure the reusable lid 360 to the reusable ring 340.

Figure 22:
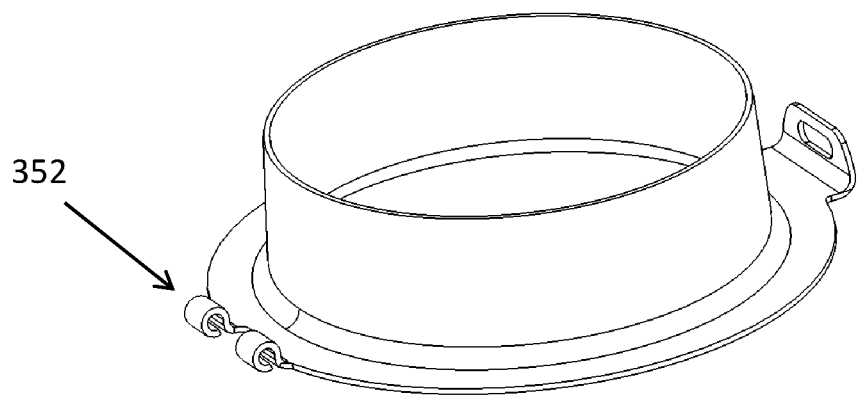
FIG. 22 is a bottom perspective view of the reusable ring of FIG. 21, in accordance with aspects of the present disclosure.

FIG. 22 shows a bottom perspective view of the reusable ring. As illustrated in FIG. 22, the attachment feature 352 is positioned below the plane of the rim 344 when the reusable ring 340 is in the upright position.

Figure 23:
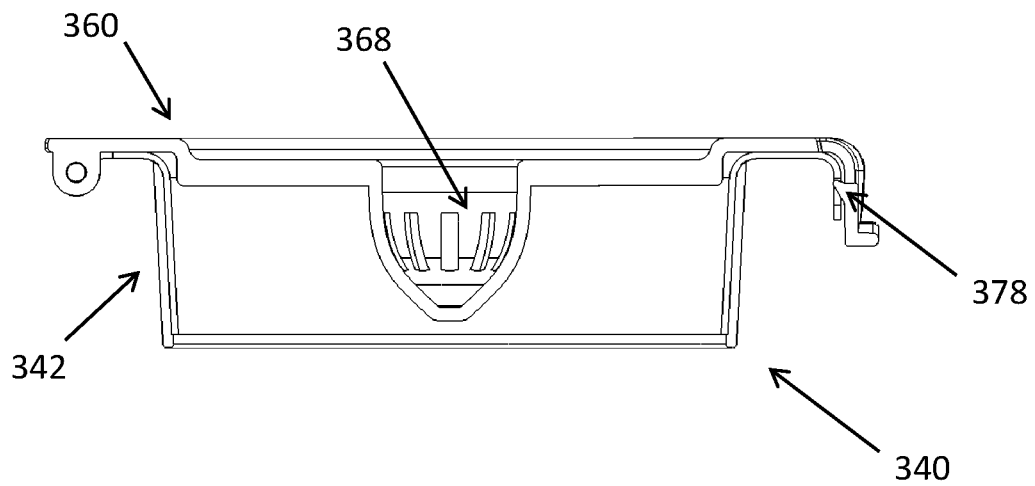
FIG. 23 is a cross-sectional view of the reusable pod apparatus of FIG. 19 with the lid closed, in accordance with aspects of the present disclosure.

FIG. 23 shows a cross-sectional view of the reusable pod apparatus of FIG. 19 in a closed position. As mentioned above, the reusable ring 340 is bottomless. The reusable lid 360 includes a percolator 368 having a plurality of apertures for distributing liquids over the ingredients in the interior of a filter. The percolator 368 may have aspects of the percolator 68 described above, and any description relating to the percolator 68 applies to the percolator 368, as well. In the illustrated embodiment, the percolator 368 extends into the interior of the ring body 342 and is approximately 90% the height of the ring body 342. In various embodiments, the percolator 368 and its aperture(s) may have other sizes, shapes, and configurations. When the reusable pod apparatus is in the closed position, there is a sealing effect so no water leaks between the reusable lid 360 and the reusable ring 340 during brewing. This sealing effect can be achieve, as mentioned above, by the engagement of a tab 378 of the catch feature of the reusable lid 360 with the slot 355 of the catch feature of the reusable ring 340.

Figure 24:
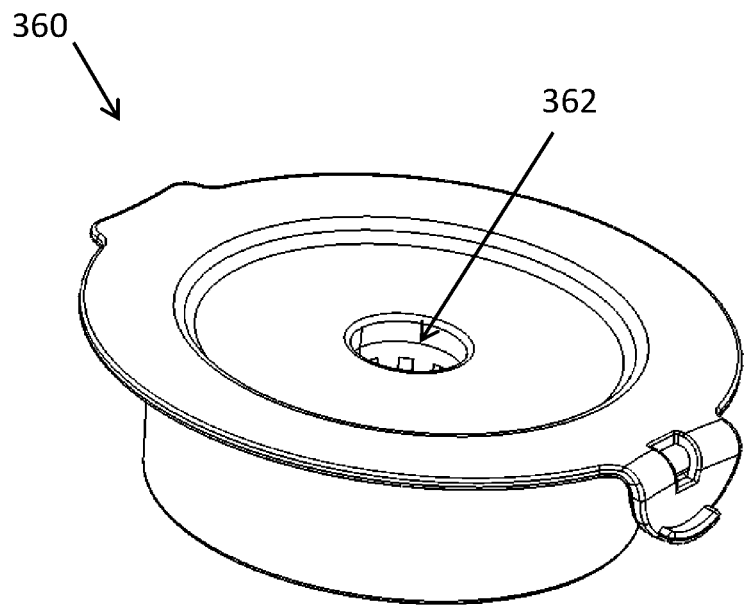
FIG. 24 is a top perspective view of the reusable pod apparatus of FIG. 19 with the lid closed, in accordance with aspects of the present disclosure.

FIG. 24 is a top perspective view of the reusable pod apparatus of FIG. 19 with the lid closed. The embodiment of FIG. 24 includes one aperture 362 in the reusable lid 360. The illustrated one-aperture embodiment is compatible with a majority of single serve brewing machines available to consumers.

Figure 25:
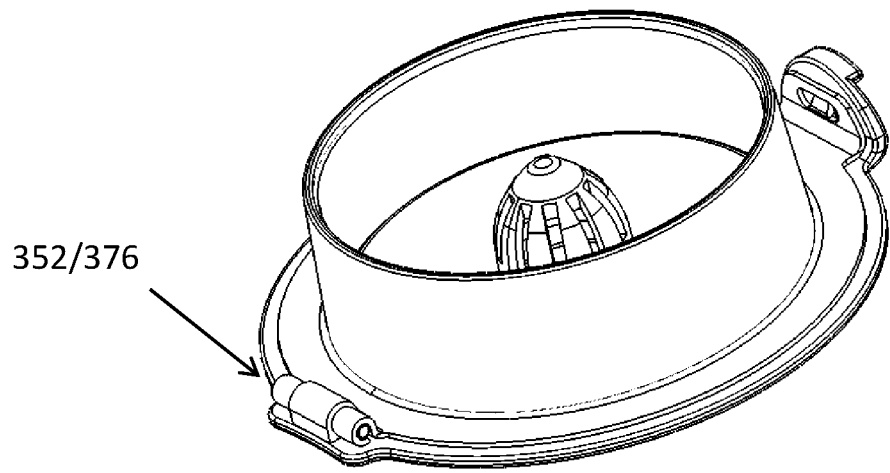
FIG. 25 is a bottom perspective of the reusable pod apparatus of FIG. 24, in accordance with aspects of the present disclosure.

FIG. 25 is a bottom perspective of the reusable pod apparatus of FIG. 24. The attachment features 352, 376 are positioned below the plane of the rim 344 when the reusable ring 340 is in the upright position. This configuration of the attachment features 352, 376 is compatible with the pod receptacles of a majority of single serve brewing machines available to consumers.

Figure 26:
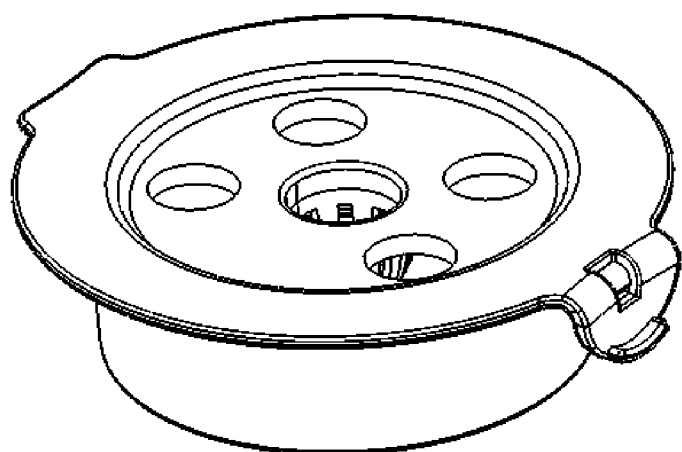
FIG. 26 is a diagram of an example of a reusable pod apparatus having a reusable lid with five apertures, in accordance with aspects of the present disclosure.

FIG. 26 is a diagram of an example of a reusable pod apparatus having a reusable lid with five apertures. The illustrated "five-hole" embodiment of the reusable pod apparatus is compatible with certain newer single serve brewing systems that direct multiple streams of hot water into the pod.

Figure 27:
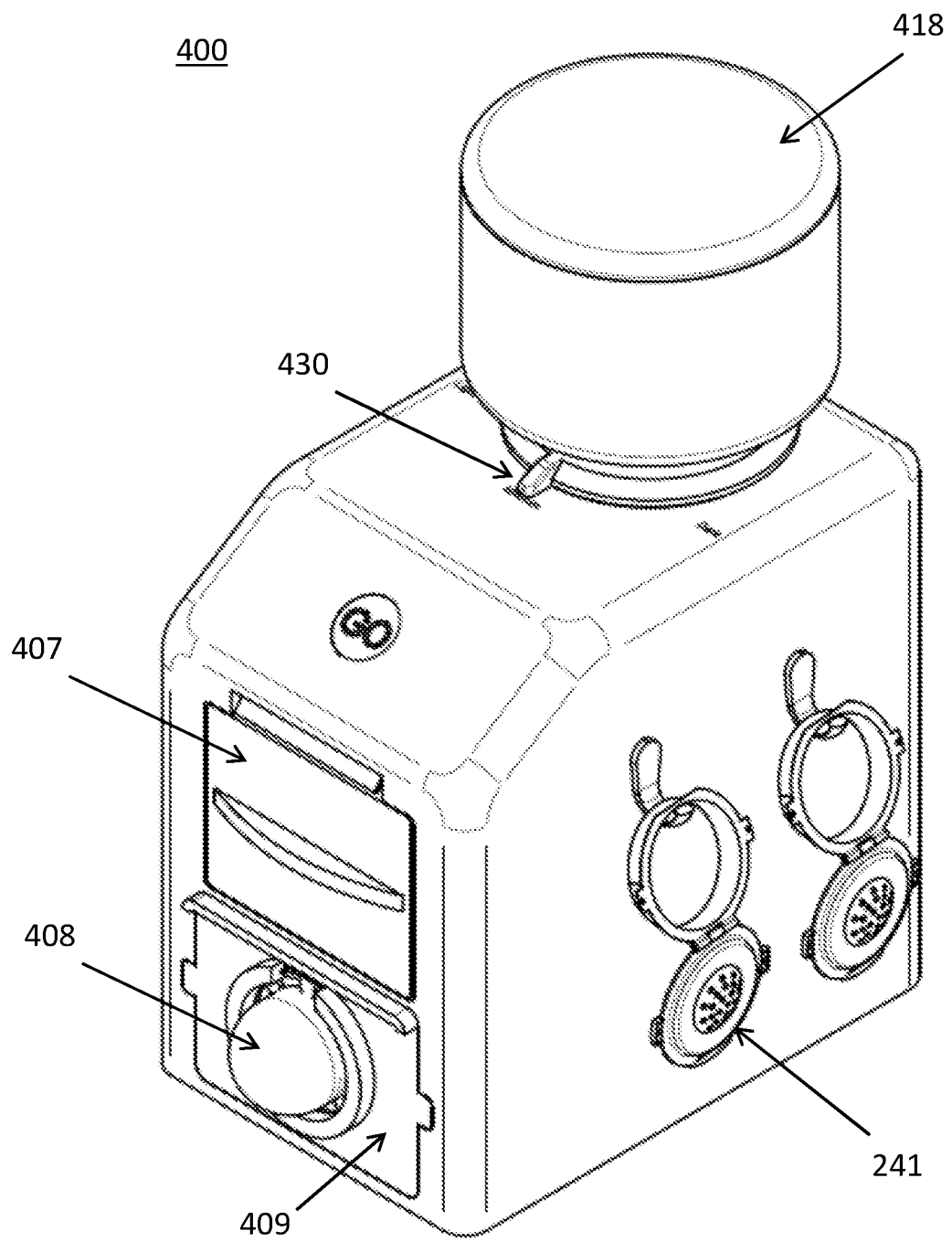
FIG. 27 is a diagram of another example of a single serve pod system with a built-in coffee grinder, in accordance with aspects of the present disclosure.

FIG. 27 is a diagram of another example of a single serve pod system. The illustrated single serve pod system 400 includes a built in grinder (not shown), which may be a coffee bean grinder. The grinder is beneath a hopper 418 that may contain coffee beans. The grinder operates to grind whole coffee beans into fresh coffee grounds and operates to dispense an appropriate amount of fresh coffee grounds into a reusable pod apparatus. The user may grab a filter 408 located at a filter drawer 409, which holds and dispenses filters from a stack of filters. Then, the user opens the pod drawer 407. The user assembles a single serve pod using the filter 408 and the reusable pod apparatus 241 and then loads the assembled single serve pod (not shown) into the pod drawing 407. The grinder includes a selector 430 that rotates to choose between light, medium, or strong to indicate how strong the user would like the coffee. When the user presses the "Go" button 417, the grinder grinds coffee beans from the hopper 418 to provide an appropriate amount of fresh coffee grounds and dispenses the fresh coffee founds into the assembled single serve pod in the pod drawer 407. This operation will be described in more detail in connection with FIG. 28.

Figure 28:
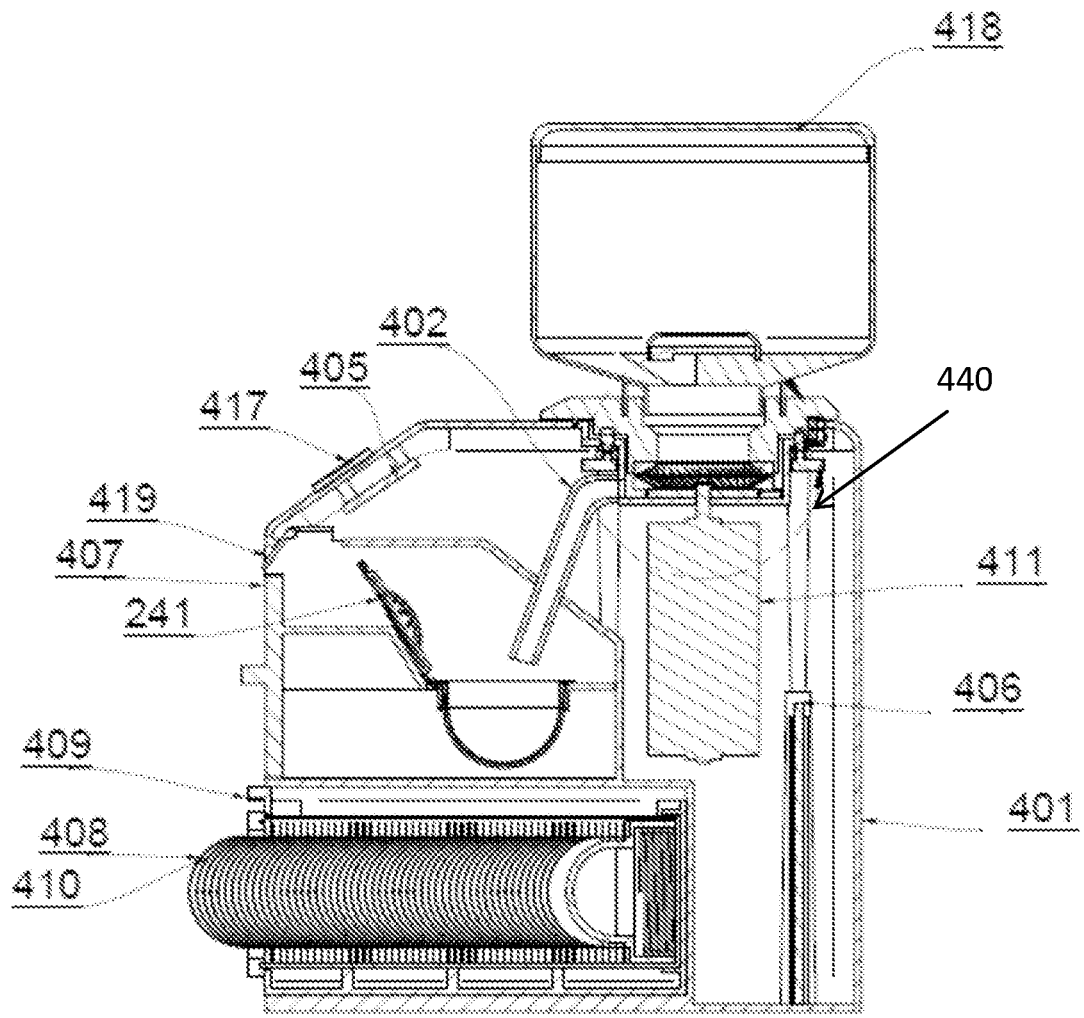
FIG. 28 is a cross-sectional view of the single serve pod system of FIG. 27, in accordance with aspects of the present disclosure.

FIG. 28 is a cross-sectional view of the single serve pod system of FIG. 27. As shown in FIG. 28, the single serve pod system includes a housing 401, a ground coffee chute 402, a secondary printed circuit board 405, a primary printed circuit board 406, a pod drawer 407, a filter 408, a filter drawer 409, a filter stack 410, a grinder motor 411, a "Go" start button 417, a hopper 418, a lid closing flap 419, and a reusable pod apparatus 241. The pod drawer 407 holds the lid of the reusable pod apparatus 241 open in a reflex angle position, which allows the filter in the pod drawer 407 to receive ground coffee from the ground coffee chute 402. The mechanism beneath the hopper 418 is indicated by a circle 440. In the circle 440 is a burr coffee grinder. An adjuster for strength selection tightens and loosens the burrs to make the coffee grounds finer or coarser for weaker or stronger flavor, respectively. The adjuster can be adjusted progressively tighter and looser to make incremental changes to cover a spectrum between light and strong coffee. The ground coffee exits the burrs and leads to the ground coffee chute 402. The user may then open the pod drawer 407, which simultaneously closes the lid of the reusable pod apparatus 241 and exposes the single serve pod ready for a user to use in a single serve brewer. Pulling the pod drawer 407 causes the lid of the reusable pod apparatus 240 to contact with the closing flap 419, thereby causing the lid to fall closed. The user may check that the lid is snapped securely closed before brew. In various embodiments, the hopper 418 may be modular and replaceable, allowing users to frequently change the coffee beans and giving them more variety and choice.

Figure 29:
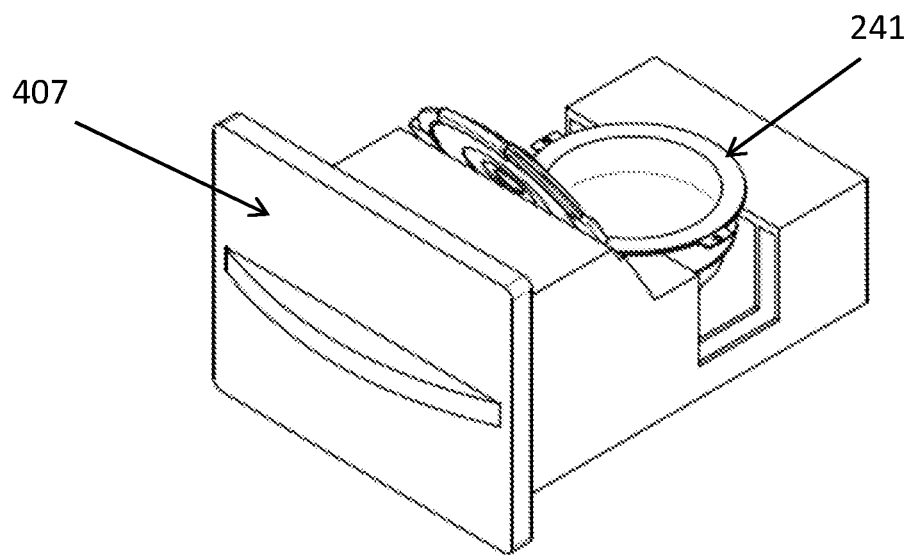
FIG. 29 is a diagram of the pod drawer of the single serve pod system of FIG. 27, in accordance with aspects of the present disclosure.

FIG. 29 is a diagram of the pod drawer 407 of the single serve pod system of FIG. 27. FIG. 29 illustrates the pod drawer 407 with the reusable pod apparatus 241. When in the illustrated position, placing a filter inside the reusable pod apparatus 241 is very easy. The lid of the reusable pod apparatus 241 is in an open position with filter loaded. After reusable pod apparatus and filter are loaded into the pod drawer 407, a user may push the pod drawer 407 inside the housing (401, FIG. 28), which places the filter opening underneath the ground coffee chute (402, FIG. 28).

Figure 30:
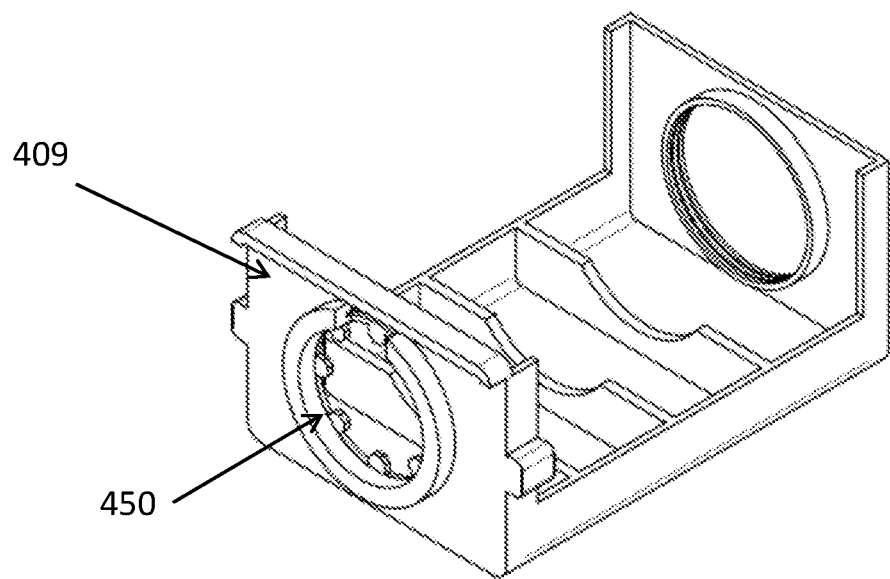
FIG. 30 is a diagram of the filter drawer of the single serve pod system of FIG. 27, in accordance with aspects of the present disclosure.

FIG. 30 is a diagram of the filter drawer 409 of the single serve pod system of FIG. 27. The filter drawer 409 is configured to hold a stack of filters (410, FIG. 28). A spring mechanism (not shown) may push the stack of filters toward the opening 450 as filters are taken by the user.

The embodiment of FIGS. 27-30 allows coffee drinkers to convert coffee beans into ground coffee for single serve pods, which gives users significantly more variety to choose from. Increased variety and options for coffee selection are tremendously increased, and users are not limited to preset coffee selections from single use pods. Freshly ground coffee from whole beans is also fresher and more cost effective for users. The grinder may freshly grind the appropriate amount of coffee needed for a single serve pod right before brewing, resulting in fresh coffee that has more flavor and aromatic properties. In various embodiments, a variation of the illustrated system does not have a grinder and, instead, has a dispenser for dispensing pre-ground coffee into a single serve pod. The dispenser may be mostly airtight to keep coffee grounds as fresh as possible.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system comprising:
a filter configured for a single serve brewing system, the filter comprising a lip and a cavity configured to hold a brew ingredient;
a reusable ring configured to hold the filter to be used in the single serve brewing system and, after being used in the single serve brewing system, to release the filter, the reusable ring being bottomless and being removable from the single serve brewing system;
a reusable lid configured to cover a top of the reusable ring, the reusable lid comprising at least one aperture, wherein the reusable lid, the filter, and the reusable ring combine to form an assembled single serve pod in which the reusable lid covers the top of the reusable ring, the lip of the filter is held between the reusable lid and the reusable ring, and the cavity of the filter extends through the reusable ring, and
wherein the assembled single serve pod is configured to be insertable into the single serve brewing system for brewing a brewed beverage and to be removable from the single serve brewing system; and
a single serve pod assembly apparatus, the single serve pod assembly apparatus comprising an assembly station configured to receive the reusable ring and the filter.

2. The system of claim 1, wherein the filter is configured to be used for a single brew in the single serve brewing system.

3. The system of claim 2, wherein the filter is formed of paper.

4. The system of claim 1, wherein the reusable ring comprises a ring body and a rim extending from a top of the ring body.

5. The system of claim 4, wherein in the assembled single serve pod, the reusable lid rests on the rim of the reusable ring.

6. The system of claim 4, further comprising a heat-resistant ring configured to surround the ring body of the reusable ring.

7. The system of claim 1, wherein the single serve pod assembly apparatus further comprises a filter dispenser configured to dispense a plurality of filters.

8. The system of claim 7, wherein the single serve pod assembly apparatus further comprises a single housing that houses the assembly station and the filter dispenser.

9. The system of claim 7, wherein the single serve pod assembly apparatus further comprises:

a storage container configured to hold a brew ingredient; and a hook configured to hang a scoop, the scoop configured to scoop the brew ingredient from the storage container and to transfer the brew ingredient into the filter in the assembly station.

10. The system of claim 9, wherein the single serve pod assembly apparatus further comprises a single housing that houses the assembly station, the filter dispenser, and the storage container.

11. The system of claim 9, wherein the single serve pod assembly apparatus further comprises a grinder configured to produce the brew ingredient.

\* \* \* \* \*